US009361567B2

(12) United States Patent
Folcke et al.

(10) Patent No.: US 9,361,567 B2
(45) Date of Patent: Jun. 7, 2016

(54) INDUCTOR

(71) Applicant: WINSTEAD ASSETS LIMITED, Roadtown, Tortola (VG)

(72) Inventors: Georges Folcke, Paris (FR); Eric Gout, Igny (FR); Christophe Raoult, Guyancourt (FR)

(73) Assignee: WINSTEAD ASSETS LIMITED, Tortola (VG)

( * ) Notice: Subject to any disclaimer, the term of this patent is extended or adjusted under 35 U.S.C. 154(b) by 0 days.

(21) Appl. No.: 14/247,227

(22) Filed: Apr. 7, 2014

(65) Prior Publication Data
US 2014/0319227 A1    Oct. 30, 2014

Related U.S. Application Data

(60) Division of application No. 13/190,257, filed on Jul. 25, 2011, now abandoned, which is a continuation of application No. 11/996,349, filed as application No. PCT/IB2006/002020 on Jul. 24, 2006, now abandoned.

(30) Foreign Application Priority Data

| Jul. 22, 2005 | (FR) | ................................. 05 07861 |
| Jul. 22, 2005 | (FR) | ................................. 05 07863 |
| Aug. 23, 2005 | (FR) | ................................. 05 08696 |
| Aug. 23, 2005 | (FR) | ................................. 05 08699 |
| Nov. 25, 2005 | (FR) | ................................. 05 12108 |
| Nov. 25, 2005 | (FR) | ................................. 05 12109 |
| Nov. 25, 2005 | (FR) | ................................. 05 12110 |
| Feb. 1, 2006 | (FR) | ................................. 06 00937 |

(51) Int. Cl.
*G06K 7/08* (2006.01)
*G06K 19/07* (2006.01)
(Continued)

(52) U.S. Cl.
CPC .......... *G06K 19/0723* (2013.01); *G06K 7/0008* (2013.01); *G06K 7/10316* (2013.01);
(Continued)

(58) Field of Classification Search
CPC ..................... G06K 19/07749; G06K 19/0775
USPC ................................. 235/492, 462.46, 472.02
See application file for complete search history.

(56) References Cited

U.S. PATENT DOCUMENTS 3,218,547 A   11/1965  Ching Ling
3,366,938 A    1/1968  Akira
(Continued)

FOREIGN PATENT DOCUMENTS

| EP | 0877439 A2 | 11/1998 |
| JP | 62298085 | 12/1987 |
| WO | 2006/102135 A2 | 9/2006 |

OTHER PUBLICATIONS

International Search Report from PCT/IB2006/002020; Feb. 20, 2007; Rafael Marti Almeda.
(Continued)

*Primary Examiner* — Daniel St Cyr
(74) *Attorney, Agent, or Firm* — BCF LLP

(57) ABSTRACT

The invention concerns an inductor comprising a plurality of so-called first conductors (100 to 109) substantially parallel to one another, at least three of said first conductors being substantially mutually equidistant and distributed over a surface (120), and an electric power supply (140) of said conductors adapted to circulate an electric current in the same direction in said conductors.
Preferably, said conductors are more densely distributed at the ends of the surface (120) comprising them.
Preferably, the inductor further comprises a plurality of second substantially parallel conductors perpendicular to the first conductors, the electric power supply circulating an electric current in the same direction on said second conductors.
Preferably, the inductor further comprises a plurality of third conductors forming closed turns, the electric power supply circulating an electric current in the same direction in said third conductors.
Preferably, the electric power supply successively powers the first, second and third conductors.

5 Claims, 32 Drawing Sheets

(51) Int. Cl.

| | | |
|---|---|---|
| *G06K 7/00* | (2006.01) | |
| *G06K 7/10* | (2006.01) | |
| *H01F 5/00* | (2006.01) | |
| *H01Q 1/22* | (2006.01) | |
| *H01Q 7/08* | (2006.01) | |
| *G06K 19/073* | (2006.01) | |
| *H01F 7/20* | (2006.01) | |

(52) U.S. Cl.
CPC ............... *G06K19/073* (2013.01); *H01F 5/00* (2013.01); *H01Q 1/2216* (2013.01); *H01Q 1/2225* (2013.01); *H01Q 7/08* (2013.01); *H01F 7/20* (2013.01)

(56) References Cited

U.S. PATENT DOCUMENTS

| | | |
|---|---|---|
| 3,597,678 A | 8/1971 | Fearon |
| 3,800,213 A | 3/1974 | Rorden |
| 4,308,513 A | 12/1981 | Layton et al. |
| 4,777,465 A | 10/1988 | Meinel |
| 4,904,923 A | 2/1990 | Zucker |
| 5,270,656 A | 12/1993 | Roberts et al. |
| 5,305,008 A * | 4/1994 | Turner ............... G01S 13/758 342/44 |
| 6,144,206 A * | 11/2000 | Goldfine et al. ............. 324/345 |
| 6,614,093 B2 * | 9/2003 | Ott et al. ....................... 257/531 |
| 6,700,547 B2 | 3/2004 | Mejia et al. |
| 6,924,767 B2 | 8/2005 | Kitahara et al. |
| 6,989,796 B2 | 1/2006 | Rahim |
| 7,042,411 B2 | 5/2006 | Yagi et al. |
| 7,339,450 B2 | 3/2008 | Lueg-Althoff et al. |
| 7,498,940 B2 * | 3/2009 | Pettus ......................... 340/572.1 |
| 7,604,160 B2 * | 10/2009 | Imine et al. .................. 235/375 |
| 2003/0197653 A1 | 10/2003 | Barber et al. |
| 2008/0284664 A1 * | 11/2008 | Hilgers ................. G06K 7/0095 343/703 |

OTHER PUBLICATIONS

English abstract of JP 62298085, Dec. 25, 1987.

\* cited by examiner

INDUCTOR

CROSS-REFERENCE TO RELATED APPLICATIONS

The present application is a divisional application of U.S. patent application Ser. No. 13/190,257, filed Jul. 25, 2011, entitled "Field Winding". Through the '257 application, the present application is a continuation of U.S. patent application Ser. No. 11/996,349, filed Jun. 2, 2008, entitled "Field Winding". The '349 is the U.S. National Stage Application of International Application PCT/IB2006/002020, filed Jul. 24, 2006, entitled "Field Winding". Through the '020 international application, the present application claims the priority of the following French patent applications: (i) No. 0507863, filed Jul. 22, 2005; (ii) No. 0507861, filed Jul. 22, 2005; (iii) No. 0508696, filed Aug. 23, 2005; (iv) No. 058699, filed Aug. 23, 2005; (v) No. 0512108, filed Nov. 11, 2005; (vi) No. 0512109, filed Nov. 11, 2005; (v) No. 0512110, filed Nov. 11, 2005; (vi) No. 0600937, filed Jan. 2, 2006. The entirety of all of the above applications is incorporated herein by reference.

FIELD OF THE INVENTION

This invention concerns, firstly, an inductor. It presents, in particular, a new antenna structure and applies, in particular, to the base station antennas used to read electronic tags.

DESCRIPTION OF RELATED ART/BACKGROUND OF THE INVENTION

Antennas formed from flat coils representing a large number of superimposed turns are known. The electromagnetic field generated by these antennas is, on their surface or near their surface, substantially perpendicular to this surface. Since electronic tags, such as transponders or RFID (Radio Frequency Identification) tags can only be read if the surface of their antenna cuts a sufficient number of field lines, they cannot be read when the plane of their antenna is oriented substantially perpendicular to the plane of the read antenna.

Antennas arranged around a volume, for example on the sides of a box through which tags pass to be read, are also known. These boxes are bulky and cannot be used for the passage of large objects.

Lastly, figure-8 shaped antennas display the following disadvantages:
  the field is high in the immediate neighborhood of the central wires but decreases quickly on moving away;
  the antenna inductance may be relatively high since all the turns are identical resulting in bulky strands around the structure (300 to 400 pH for an antenna of 30 cm by 40 cm)
  these antennas are poorly adapted to reading stacks of RFID tags (a few dozen for example).

SUMMARY OF THE INVENTION

This invention aims to overcome these disadvantages.

This invention therefore relates, according to a first aspect, to an inductor characterized in that it comprises a plurality of so-called first conductors substantially parallel to one another, at least three of said first conductors being substantially mutually equidistant and distributed over a surface, and an electric power supply of said conductors adapted to circulate an electric current in the same direction in said conductors.

Thanks to these arrangements, a magnetic field is generated which is substantially perpendicular to the conductors and substantially parallel to the surface containing them.

In addition the inductance is reduced, compared with a figure-8 antenna, which means that the voltage across the terminals of this antenna can be reduced in proportion. The electric power supply is therefore easier (for example with a voltage divided by two). Also the transmitter so formed is more reliable.

According to special characteristics, said conductors have a linear part, said linear parts being arranged in a plane.

Thanks to these arrangements, a magnetic field is generated parallel to said plane.

According to special characteristics, said conductors are more densely distributed at the ends of the surface comprising them.

According to special characteristics, said conductors are less densely distributed at the centre of the surface comprising them.

Thanks to each of these arrangements, the intensity of the magnetic field generated is more constant than if the conductors were uniformly distributed.

According to special characteristics, at least some of the first conductors are connected together by conductors forming with them partially superimposed turns.

According to special characteristics, at least some of the conductors connecting together said first conductors surround said first conductors in said surface.

According to special characteristics, at least some of the conductors connecting together said first conductors are on the same side of a plane comprising said first conductors.

Thanks to these arrangements, the magnetic field generated on the other side of said plane is less disturbed by the magnetic field of these conductors connecting together the first conductors than if they were in the same plane.

According to special characteristics, all of said first conductors are symmetrical with respect to a plane and/or with respect to a point.

Thanks to these arrangements, it is easier to comply with the applicable regulations concerning electromagnetic emissions, for example the standards known as "ETSI ETS 300 330".

According to special characteristics, at least some of the conductors connecting together said first conductors have a coplanar linear part on the same side of a plane comprising said first conductors.

Thanks to these arrangements, the intensity of the magnetic field generated, on the edges of said plane closest to these conductors connecting together the first conductors, is increased.

According to special characteristics, the inductor as outlined above comprises, in addition, a plurality of second conductors parallel to one another and substantially perpendicular to the first conductors, said electric power supply adapted to circulate an electric current in the same direction in said second conductors.

Thanks to these arrangements, by circulating an electric current alternately in the first and second conductors, two substantially perpendicular magnetic fields are generated alternately in order to read at least all the electronic tags whose antennas are perpendicular to said plane. In addition, by circulating sinusoidal electric currents with a phase shift of 90° on the first and second conductors, a rotary magnetic field of substantially constant intensity is generated.

According to special characteristics, the inductor as outlined above comprises, in addition, a plurality of so-called third conductors forming identical closed turns, said electric power supply adapted to circulate an electric current in the same direction in said third conductors. Thanks to these arrangements, by powering only said third conductors, a magnetic field is generated which is substantially perpendicular to the surface of these third conductors.

According to special characteristics, the third conductors surround said first conductors. Thanks to these arrangements, at least all the tags near said surface, whose antennas are perpendicular to said surface or perpendicular to the first conductors, can be read.

According to special characteristics, said electric power supply is adapted to generate a current alternately on said first, second and third conductors.

According to a second aspect, this invention relates to a device chosen from a support, a pallet, a container, a conveyor, a cash register or a base station comprising the inductor as outlined above.

Since the advantages and purposes of this support, this pallet, this container, this conveyor, this cash register or this base station are similar to those of the inductor as outlined above, they are not mentioned here.

This invention also relates to an electronic tag, a reading method and a method to query such an electronic tag. It applies in particular to radio frequency electronic tags.

The radio frequency electronic tags, known as "RFID" (Radio Frequency IDentification), are well known for their ability to supply an identification signal in response to base station query signals, said signals modulating an electromagnetic field generated by the base station.

However, in order to read a set of tags randomly orientated in a given volume, it is often necessary to plan, in the base station, a set of antennas which each cover parts of said volume and particular tag orientations. Each antenna is implemented for a time interval forming part of a complete read cycle, time interval during which a tree structure of possible identifiers for the electronic tags is browsed, at least partially. All tags whose antenna axis is not perpendicular to the axis of the magnetic field generated by the antenna are then likely to respond during the time interval considered.

In this case, there is a risk that a large number of tags are identified several times, during each time interval when a tag receives requests from the base station. The tag antenna axes, randomly oriented, are in fact rarely perpendicular to two, or even to one of the axes of the magnetic fields generated successively.

For example, when six antennas are implemented (two antennas successively cover the entire given volume, for each of the three axes), some tags are read two or three times during a complete cycle.

Identification of all the tags is therefore slowed down by a factor of two at least. The speed at which a group of tags is read, however, is a key factor when selecting an electronic tag technology.

This invention aims to overcome these disadvantages. This invention therefore relates, according to a third aspect, to a passive electronic tag designed to be read by a set of antennas of a base station, successively generating magnetic fields during a read cycle, characterized in that said electronic tag includes:
  a means of transmitting responses to requests modulating said magnetic field and
  an inhibition means adapted, even in the absence of any electric power supply from the base station, to inhibit the response transmission means at least for the duration of a said read cycle.

Thanks to these arrangements, when the electronic tag has been read, it is inhibited throughout the duration of the read cycle and consequently cannot be read twice. The speed at which a group of randomly oriented tags is read is therefore significantly increased.

We observe that implementing this invention requires no modifications to the base station, only the electronic tag is modified to become inhibited for a duration several times longer than the inhibition durations currently implemented, which only concerns one of the above-mentioned time intervals.

According to special characteristics, the electronic tag as outlined above comprises a means of determining the complete identification of said electronic tag, said inhibition means inhibiting the transmission means when the determination means has determined that the electronic tag has been completely identified.

According to special characteristics, the electronic tag comprises a reception means for reception of an acknowledgement of receipt from the base station and the means to determine the complete identification of the electronic tag is adapted to determine that an acknowledgement of receipt has been received by the base station.

According to special characteristics, the transmission means is adapted to successively transmit sections of the identifier of said electronic tag and the determination means is adapted to determine that all sections of the electronic tag identifier sections have been transmitted by the transmission means.

According to special characteristics, the inhibition means comprises a capacitor.

According to special characteristics, the inhibition means comprises a transistor mounted as a diode to check the charge of said capacitor.

Thanks to these arrangements, the inhibition duration can last for several tens of seconds.

According to a fourth aspect, this invention relates to an operating method of a passive electronic tag, characterized in that it comprises:
  a step to answer requests from a base station and
  once the tag has supplied its complete identification, an extended inhibition step of duration at least equal to the duration of a said read cycle, even in the absence of any electric power supply from said base station.

According to special characteristics, the extended inhibition step is executed after a step to receive an acknowledgement of receipt of the complete identification of said electronic tag.

According to special characteristics, the method as outlined above comprises a step to exit the inhibition, in response to reception of a request to exit extended inhibition, from said base station.

According to a fifth aspect, this invention relates to a method to query passive electronic tags, characterized in that it comprises:
  a step to identify at least one electronic tag during which a magnetic field is generated with at least one first antenna,
  a step to transmit an extended inhibition request for each electronic tag identified,
  a step to identify at least one electronic tag during which a magnetic field is generated with at least one second antenna different from each first antenna and
  a step to transmit a request to exit extended inhibition for each electronic tag identified during which a magnetic field is generated with each said first antenna.

Since the advantages, aims and special features of this method are similar to those of the electronic tag outlined above, they are not described here.

This invention also concerns an inductor to generate a magnetic field, a base station and a conveyor comprising it. It applies in particular to the base stations or electronic tag readers used in the field of radio frequency identification known as RFID (Radio Frequency Identification).

Numerous, generally flat, shapes of inductor or antenna are known, intended for integration in portals, for example placed at store exits or in storage areas in order to read electronic tags. These inductors are unable to generate a sufficiently strong magnetic field if the electronic tags are close to metal or organic parts or water, and more generally materials which disturb electromagnetic fields.

Solenoid-shaped inductors are also known, which can be used to generate an intense electromagnetic field. However, solenoids may not be adapted to manufacturing processes mainly involving conveyors while respecting statutory constraints in terms of electromagnetic radiation.

This invention aims to overcome these disadvantages.

This invention therefore relates, according to a sixth aspect, to an inductor, characterized in that it comprises two strands of electrical conductors forming two non-planar loops through which current flows with opposite directions of rotation.

Thanks to these arrangements, in a convexity area located between said non-planar loops, the electromagnetic field is increased in a direction going from one loop to the other.

According to special characteristics, each non-planar loop is mostly contained in the junction of two planes.

According to special characteristics, said planes are orthogonal.

According to special characteristics, each loop consists of straight segments.

According to a seventh aspect, this invention relates to a conveyor comprising a means of moving products bearing electronic tags and at least one inductor as outlined above placed around the path followed by said product.

According to special characteristics, the conveyor is adapted to move products bearing electronic tags through an arch formed by the inductor.

According to special characteristics, the conveyor is adapted to position electronic tags near the inductor, with the antenna axis of each electronic tag substantially parallel to an axis going through the two loops.

Thanks to each of these arrangements, the mutual inductance between the inductor and the electronic tag antenna is high as the tag passes through the arch with its antenna substantially perpendicular to the field lines.

According to an eighth aspect, this invention relates to a base station comprising at least one inductor as outlined above and electronic circuits to generate signals applied to each said inductor and to process signals from each said inductor.

Since the advantages, aims and features of this conveyor and of this base station are similar to those of the inductor outlined above, they are not described here.

This invention also relates to a storage rack with automatic tag reading device and a computer system comprising it. It applies, in particular, to the storage of products and supplies and to the replenishment of the stocks concerned.

A device to store and identify articles equipped with a bar code described in document U.S. Pat. No. 4,636,634 is known. The bar codes indicate the identity of the articles with which they are associated. This device comprises at least one container adapted to receive an article equipped with a code and, in each container, presence detection means to detect the presence of an article in a container, bar code reading means and circuits connected to the presence detection means and to the reading means to provide an indication of the presence and identity of articles in the containers.

The manufacture of this device is complex since each container must be equipped with two means, firstly to detect the presence of an article and secondly, if an article is present, to read its code. In addition, this device is unreliable since incorrectly positioning the code in the container is sufficient to prevent the code from being read.

This invention aims to overcome these disadvantages.

This invention therefore relates, according to a ninth aspect, to a rack, characterized in that it comprises:
  on at least one wall, at least one antenna comprising at least two co-planar loops through at least one of which current flows in the clockwise direction and, simultaneously, on at least one other loop, the current flows in the anticlockwise direction,
  a signal generation circuit to generate signals transmitted by each said antenna, to generate an electromagnetic field, and
  a signal reception circuit modulating said magnetic field.

Thanks to these arrangements, electronic tags within a highly elongated volume with respect to the plane of said loops can be read.

According to special characteristics, at least one said antenna comprises two loops.

According to special characteristics, at least one said antenna comprises three loops.

According to special characteristics, at least one said antenna comprises four loops.

According to special characteristics, at least one wall containing at least one of the antennas forms the back of the rack.

According to special characteristics, at least one wall containing at least one of the antennas forms a side wall of the rack.

According to special characteristics, at least one wall containing at least one of the antennas forms a central wall of the rack.

According to special characteristics, the signal generation circuit is adapted to successively generate signals for various sets of antennas.

Thanks to these arrangements, antennas oriented along different axes, possibly orthogonal to one another, can be read successively.

According to special characteristics, the rack as outlined above comprises products comprising at least one metallic part with at least one narrow edge and an electronic tag with one antenna positioned substantially perpendicular to a narrow edge of said metallic part.

The inventors have in fact discovered that, with these characteristics, the electronic tag could be read despite the proximity of the metallic part and the electronic tag.

According to special characteristics, the electronic tag antenna has a width, measured in the direction of the thickness of the metallic part, greater than the thickness of the edge of the metallic part opposite which the antenna is positioned.

According to special characteristics, the product has the shape of a rectangular parallelepiped and comprises said electronic tag on one of its four smallest sides.

According to special characteristics, the product has the shape of a rectangular parallelepiped and comprises a paper label positioned on one side of the product opposite to a side of the product bearing said electronic tag.

According to special characteristics, the product has the shape of a rectangular parallelepiped and comprises a paper label positioned on one side of the product adjacent to a side of the product bearing said electronic tag on one of its small sides.

Thanks to each of these arrangements, when the product is stored, in a stack or vertically in a cabinet, the user is encouraged to position it so that its paper label is visible. Due to this position, the electronic tag is positioned toward an antenna positioned so as to read the electronic tags.

According to special characteristics, said rack comprises a user identification card reader.

Thanks to these arrangements, each product removed from the rack can be associated with the identity of the person removing it, a patient, a procedure, an operating theatre or a doctor, for example.

According to special characteristics, the rack as outlined above comprises warning means adapted to trigger a warning when a minimum number of products of a particular reference has been reached in said rack.

According to special characteristics, the rack as outlined above comprises warning means adapted to trigger a warning on approaching the use-by-date of a product present in said rack.

Thanks to these arrangements, product procurement is made more secure.

According to a tenth aspect, this invention relates to a computer system, characterized in that it comprises:
- in at least one product user centre, at least one rack as outlined above, containing products from at least one supplier;
- a server having a database containing information about the products contained in at least one said rack, this database being associated with at least one microprocessor unit and with means of communicating with said rack;
- a device located in each product user centre including a microprocessor unit associated with means of communicating with said server;
- a device located on the premises of each supplier including a microprocessor unit associated with means of communicating with said server;
- said server comprising means of selective access to the database, adapted to allow each product user centre to have access to all its own stock of products contained in said racks, irrespective of the product suppliers, and to allow each supplier to access, for all product user centers, the stock level, in said racks, of its own products.

Thanks to these arrangements, each product user centre can find, in real time, the level and location of its stocks, each supplier can program the future productions and deliveries and the confidentiality of each party's data is guaranteed.

According to special characteristics, the server comprises a computer program adapted to trigger warnings when a minimum number of products of a particular reference has been reached in the stock of a product user centre.

According to special characteristics, the server comprises a computer program adapted to produce a sales report for each supplier providing a summary of references by product user centre and/or by territory.

Thanks to each of these arrangements, stock management is simplified and efficient both for the product user centers and the suppliers of these product user centers.

Since the advantages, aims and special features of this computer system are identical to those of the rack outlined above, they are not described here.

This invention also concerns an electronic tag and a base station to query it. It applies, in particular, to the use of radio frequency electronic tags associated with objects with metallic parts or conducting materials, to identify these objects.

The radio frequency electronic tags, known as "RFID" (Radio Frequency Identification), are well known for their ability to supply an identification signal in response to base station query signals, said signals modulating a magnetic field generated by the base station.

When inserting this type of tag in an object comprising metallic parts and in particular when the electronic tag must be in contact or, at least partially, surrounded by a metallic part, the disturbance produced by the metallic part on the tag antenna and reader characteristics are likely to prevent its operation.

The presence of metal acts in various ways on the radio frequency identification:
- firstly, in case of passive tags, the tag is insulated by the metal and the magnetic field must therefore be strong enough so that sufficient energy remains to power the tag.
- secondly, for all tags, active or passive, the metal reduces the intensity of the query signals which may therefore not be detected by the tags, and
- lastly, the metals present affect the base station reader antenna, significantly reducing the magnetic field available.

The ability of a base station to query electronic tags is therefore significantly reduced. This invention aims to overcome these disadvantages.

According to an eleventh aspect, this invention therefore relates to a device comprising at least one metallic part, characterized in that it comprises an electronic tag which comprises, opposite said metallic part:
- a reception means to receive signals modulated at a first frequency:
- a processing means to process said signals to identify a query signal to which said electronic tag must reply and
- a transmission means to transmit signals modulated at a second frequency different from said first frequency.

The inventors have in fact discovered that by implementing two different frequencies, although the sensitivity of the tag is affected, its electrical characteristics are relatively unchanged.

According to special characteristics, said first frequency is less than 200 kHz. Thanks to these arrangements, penetration of the magnetic field in the metallic parts is improved.

According to special characteristics, said second frequency is equal to half the first frequency.

Choosing to use a non-resonating tag (whose product $LC\omega^2$ is not equal to 1, where L is the inductance, C the capacitance and $\omega$ the angular frequency) rules out the use of backscattering for the response from the tags. By choosing to reply at half the frequency, this frequency is more easily detected on the base station antenna. In addition, automatic tuning guarantees that a maximum amount of energy will be available to power the electronic tag.

According to special characteristics, the transmission means modulates or loads one alternation out of two of the carrier of the signal received by the reception means to obtain a signal of half the frequency.

The tag therefore only cuts about 80% of the signal.

According to special characteristics, the transmission means comprises at least two diodes adapted to guarantee a minimum signal at the first frequency on the electronic tag antenna.

According to a twelfth aspect, this invention relates to a base station to query electronic tags, characterized in that it comprises:
- a transmission means to transmit signals modulated at a first frequency:
- a reception means to receive signals modulated at a second frequency different from said first frequency, comprising an antenna and adapted to vary a read frequency by controlling the amplitude of the voltage on the antenna in order to constantly check that $LC\omega^2=1$, formula in which L is the antenna inductance, C the antenna capacitance and ω the angular frequency, equal to 2.pi.f, where f is the frequency and a processing means to process said signals modulated at the second frequency to identify a response signal transmitted by said electronic tag.

According to special characteristics, said first frequency is less than 200 kHz.

According to special characteristics, said second frequency is equal to half the first frequency.

According to special characteristics, the reception means comprises an antenna and is adapted to vary a read frequency by controlling the amplitude of the voltage on the antenna in order to constantly check that $LC\omega^2=1$, formula in which L is the antenna inductance, C the antenna capacitance and ω the angular frequency, equal to 2.pi.f, where f is the frequency.

The electronics therefore provide automatic tuning in order to obtain the maximum magnetic field according to the metallic mass and its position in front of the antenna.

According to special characteristics, the transmission means and the reception means comprise a common antenna and the reception means comprises an analogue to digital converter which transmits the peak value present on the antenna to the processing means.

According to special characteristics, the analogue to digital converter is connected to said antenna via a divider bridge of high impedance adapted to keep the level of the setpoint between 0 V and 10 V and not disturb the tuning of the antenna.

According to special characteristics, the processing means is adapted to compare said peak value with a voltage setpoint acquired in the absence of metallic objects within the field of said antenna.

According to special characteristics, the processing means is adapted to vary the frequency to reach the level of the setpoint by changing the inputs of a counter.

Since the advantages, aims and special features of this base station are similar to those of the device outlined above, they are not described here.

This invention also concerns a base station to query electronic tags. It applies, in particular, to the querying of radio frequency electronic tags and, especially, to the case where objects with metallic parts or conducting materials are likely to lie within the base station transmission field.

The radio frequency electronic tags, known as "RFID" (Radio Frequency Identification), are well known for their ability to supply an identification signal in response to base station query signals, said signals modulating a magnetic field generated by the base station.

When an electronic tag enters the transmission field of a base station, its antenna disturbs this field and modifies the resonance frequency of the base station antenna, possibly causing a decrease in the gain of the base station antenna. When, in addition, the electronic tag replies at the same frequency as the signal transmitted by the base station, for the response as well, the gain of the base station antenna may be lowered.

This problem is amplified if numerous electronic tags or metallic parts are likely to enter the field of the base station. For example, when inserting an electronic tag in an object comprising metallic parts and in particular when the electronic tag must be in contact or, at least partially, surrounded by a metallic part, the disturbances caused by the metallic part on the gain of the base station antenna may impair the communication between the base station and the electronic tag.

The presence of metal acts in various ways on the radio frequency identification:

firstly, in case of passive tags, the tag is insulated by the metal and the magnetic field must therefore be strong enough so that sufficient energy remains to power the tag.

secondly, for all tags, active or passive, the metal reduces the intensity of the query signals which may therefore not be detected by the tags, and lastly, the metals present affect the base station reader antenna, significantly reducing the magnetic field available.

The ability of a base station to query electronic tags is therefore significantly reduced. This invention aims to overcome these disadvantages.

According to a thirteenth aspect, this invention therefore relates to a base station to query electronic tags, characterized in that it comprises:

a transmission circuit comprising an antenna for transmission of query signals and a slaving means to slave the frequency Fr of the signal transmitted by said antenna so that this frequency Fr respects the equation $L \times C \times (2 \times pi \times Fr)^2 = 1$, equation in which L is the inductance of the transmission circuit comprising the antenna and C is the capacitance of the transmission circuit comprising the antenna.

Thanks to these arrangements, the frequency of the signal transmitted by the antenna is the antenna resonance frequency, even when the inductance of the transmission circuit is disturbed by the presence of metallic parts or antennas, for example those of the electronic tags, in the field of the base station antenna.

The gain of the transmission antenna therefore remains substantially constant irrespective of the disturbances encountered.

According to special characteristics, the base station as outlined above comprises a reception circuit comprising the transmission antenna.

Thanks to these arrangements, the reception circuit can take into account the variations of the frequency Fr in detection of the signal from electronic tags, especially in the general case where the transmitted signal is much stronger than the received signal.

According to special characteristics, the transmission circuit comprises a capacitor in series with the antenna and an image bridge comprising in series an inductor and a capacitor, the capacitor in series with the antenna, the inductor and the capacitor of the image bridge being adapted so that the voltage between the antenna and the capacitor in series with the antenna is substantially equal to the voltage between the inductor and the capacitor of the image bridge.

Thanks to these arrangements, a signal received by the antenna can be detected by difference between the voltage between the antenna and the capacitor in series with the antenna and the voltage between the inductor and the capacitor of the image bridge.

According to special characteristics, the transmission circuit comprises a transformer whose primary circuit is connected, firstly, between the antenna and the capacitor in series with the antenna and, secondly, between the inductor and the capacitor of the image bridge.

Thanks to these arrangements, the signals received from the electronic tags can be amplified.

According to special characteristics, the base station as outlined above comprises a filtering and amplification circuit connected to the secondary circuit of the transformer.

Thanks to these arrangements, the signals received from the electronic tags are filtered and amplified before being processed by the base station, for example to identify the electronic tags.

According to special characteristics, the base station as outlined above comprises an analogue to digital converter which transmits the peak value present on the antenna to a processing means to process the signals received by the base station from the electronic tags.

According to special characteristics, the analogue to digital converter is connected to said antenna via a divider bridge of high impedance adapted to keep the level of the setpoint between 0 V and 10 V and not disturb the tuning of the antenna.

According to special characteristics, the processing means is adapted to compare said peak value with a voltage setpoint acquired in the absence of metallic objects within the field of said antenna.

According to special characteristics, the base station as outlined above comprises:
- a reception means to receive signals modulated by electronic tags, comprising an antenna and adapted to vary a read frequency by controlling the amplitude of the voltage on the antenna in order to constantly check that $LC\omega^2=1$, formula in which L is the antenna inductance, C the antenna capacitance and $\omega$ the angular frequency, equal to 2.pi.f, where f is the frequency and
- a processing means to process said signals modulated by the electronic tags to identify a response signal transmitted by said electronic tag.

The electronics therefore provide automatic tuning in order to obtain the maximum magnetic field according to the metallic mass and its position in front of the antenna.

According to special characteristics, the transmission means and the reception means comprise a common antenna.

This invention also concerns an electronic tag. It applies, in particular, to radio frequency electronic tags and, especially, to the case where objects with metallic parts or conducting materials are likely to be present near the electronic tags queries.

The radio frequency electronic tags, known as "RFID" (Radio Frequency Identification), are well known for their ability to supply an identification signal in response to base station query signals, said signals modulating a magnetic field generated by the base station.

When an electronic tag enters the transmission field of a base station, its antenna disturbs this field and modifies the resonance frequency of the base station antenna, possibly causing a decrease in the gain of the base station antenna. When, in addition, the electronic tag replies at the same frequency as the signal transmitted by the base station, for the response as well, the gain of the base station antenna may be lowered.

This problem is amplified if numerous electronic tags or metallic parts are likely to enter the field of the base station. For example, when inserting an electronic tag in an object comprising metallic parts and in particular when the electronic tag must be in contact or, at least partially, surrounded by a metallic part, the disturbances caused by the metallic part on the gain of the base station antenna may impair the communication between the base station and the electronic tag.

The presence of metal acts in various ways on the radio frequency identification:

firstly, in case of passive tags, the tag is insulated by the metal and the magnetic field must therefore be strong enough so that sufficient energy remains to power the tag.

secondly, for all tags, active or passive, the metal reduces the intensity of the query signals which may therefore not be detected by the tags, and lastly, the metals present affect the base station reader antenna, significantly reducing the magnetic field available.

The ability of a base station to query electronic tags is therefore significantly reduced. This invention aims to overcome these disadvantages.

According to a fourteenth aspect, this invention therefore relates to an electronic tag, characterized in that it comprises a circuit for reception of signals from a base station, said reception circuit comprising an antenna whose resonance frequency is at least double the frequency of the signal received from the base station.

Thanks to these arrangements, the gain of the electronic tag antenna is close to 1 at the frequency transmitted by the base station antenna.

According to special characteristics, the electronic tag comprises:
- a reception means to receive signals modulated at a first frequency:
- a processing means to process said signals to identify a query signal to which said electronic tag must reply and
- a transmission means to transmit signals modulated at a second frequency different from said first frequency.

The inventors have in fact discovered that by implementing two different frequencies, although the sensitivity of the tag is affected, its electrical characteristics are relatively unchanged.

According to special characteristics, said first frequency is less than 200 kHz. Thanks to these arrangements, penetration of the magnetic field in the metallic parts is improved.

According to special characteristics, said second frequency is equal to half the first frequency.

Choosing to use a non-resonating tag (whose product $LC\omega^2$ is not equal to 1, where L is the inductance, C the capacitance and $\omega$ the angular frequency) rules out the use of backscattering for the response from the tags. By choosing to reply at half the frequency, this frequency is more easily detected on the base station antenna. In addition, automatic tuning guarantees that a maximum amount of energy will be available to power the electronic tag.

According to special characteristics, the transmission means modulates or loads one alternation out of two of the carrier of the signal received by the reception means to obtain a signal of half the frequency.

The tag therefore only cuts about 80% of the signal.

According to special characteristics, the transmission means comprises at least two diodes adapted to guarantee a minimum signal at the first frequency on the electronic tag antenna.

This invention also concerns a conducting product comprising an electronic tag, a method and a device for identification of such products. It applies, in particular, to remote identification of metallic blisters implementing a radio frequency identification known as RFID (Radio Frequency Identification).

Remote identification by electromagnetic waves implements a reader, also known as a base station, and an electronic tag, also known as a transponder, associated with each product to be identified. Each electronic tag has a generally unique identification code consisting, for example, of 64 bits, forming a code of standardized structure and meaning. To read an electronic tag, the base station transmits an electromagnetic field modulated to carry a query signal and possibly to power the electronic tags. On reception of this query signal, each electronic tag determines whether it must reply and what it must reply. For example, only electronic tags whose identification code starts with data indicated, explicitly or implicitly, by the base station must reply and they must reply providing one or more data items in addition to their identification code. Other examples implement an anti-collision protocol in which each electronic tag determines, for example randomly, when it must reply in order to reduce the risk that two electronic tags reply simultaneously, generating interference between their response signals and preventing correct reception of these signals by the base station.

As we can easily understand, the presence of conducting parts, for example metallic parts or films or those comprising a high proportion of water, disturb the electromagnetic fields used and limit, or even prevent, communication between the base station and the electronic tags.

This invention aims to overcome these disadvantages.

This invention therefore relates, according to a fifteenth aspect, to a product comprising a substantially flat, at least locally, metallic part, characterized in that it comprises an electronic tag whose antenna is positioned near said metallic part, the axis of said antenna being parallel to the local plane of said metallic part.

Thanks to each of these arrangements, the magnetic field parallel to the plane of the metallic part can be picked up by the electronic tag antenna. Each electronic tag can therefore be read, even when several similar products are stacked up.

According to special characteristics, the antenna of said electronic tag is positioned near and parallel to an edge of said metallic part.

Thanks to these arrangements, the disturbances due to the presence of the metallic part are reduced near the electronic tag.

According to special characteristics, said metallic part is a metallic blister film.

Thanks to these arrangements, small blisters may nevertheless be equipped with a practically invisible electronic tag.

According to special characteristics, the product as outlined above comprises a groove formed in a non-conducting material, parallel and close to an edge of said metallic part, the antenna of said electronic tag being positioned in said groove.

Thanks to these arrangements, the electronic tag can be easily and automatically deposited in the blister at the same time as the contents, for example tablets or capsules, stored in the blister.

According to special characteristics, said electronic tag comprises:
- a core of electrically-insulated material of relative magnetic permeability above fifty,
- a coil surrounding said core, coil forming an antenna adapted to receive a query signal from a base station,
- a memory storing an identification code and
- processing means adapted to process the query signal from the base station to determine whether the electronic tag must reply and, if yes, to command transmission of a signal by said antenna.

Thanks to these arrangements, the antenna sensitivity is multiplied according to the relative magnetic permeability of the material forming the core, a value which may exceed 250, or even 650, for a ferrite core, compared with the same antenna without ferrite core.

According to special characteristics, said core comprise a ferrite. Thanks to these arrangements, the sensitivity gain may be very high, ferrites having very high magnetic permeability's.

According to special characteristics, the coil wire is thermo adherent. Thanks to these arrangements, the coil is easily manufactured.

According to special characteristics, said tag is passive. Thanks to these arrangements, its cost price, size and weight can be reduced and its lifetime extended.

According to a sixteenth aspect, this invention relates to a device to identify at least one product as outlined above, product comprising a substantially plane metallic part, characterized in that it comprises a transmitting antenna adapted to generate magnetic field lines parallel to the axis of said antenna of the electronic tag.

Thanks to these arrangements, the products can be identified in a large volume.

According to special characteristics, the device as outlined above comprises a presentation means to present one product at a time opposite said transmitting antenna such that the plane of said metallic part is perpendicular to the main plane of said transmitting antenna and such that the core of the electronic tag carried by said product is substantially parallel to the field lines generated by said transmitting antenna.

According to special characteristics, the device as outlined above comprises a presentation means to present a plurality of products forming at least one stack opposite said transmitting antenna such that the plane of each metallic part is perpendicular to the main plane of said transmitting antenna and such that the cores of the electronic tags carried by said products are substantially parallel to the field lines generated by said transmitting antenna.

According to special characteristics, said presentation means is a conveyor.

Thanks to each of these arrangements, the products can be identified in stacks. According to a seventeenth aspect, this invention relates to a method to identify at least one product comprising a substantially flat metallic part, characterized in that it comprises:
- a step to mechanically associate said product with an electronic tag whose antenna is perpendicular to the plane of said mechanical part and
- a step to position said product opposite a transmitting antenna of the base station so that the transmitting antenna generates magnetic field lines parallel to the axis of said electronic tag antenna.

Since the advantages, aims and special features of this method are similar to those of the device outlined above, they are not described here.

The various aspects of this invention, their main characteristics and their special characteristics are intended to be combined to form a universal electronic tag reading system. Each main or special characteristic of each aspect of this invention therefore forms a special characteristic of each other aspect of this invention.

BRIEF DESCRIPTION OF THE DRAWINGS

Other advantages, aims and features of this invention will appear on reading the following description, given for a non-limiting explanatory purpose and referring to the attached drawings in which.

DETAILED DESCRIPTION

FIGS. 1 to 13 concern more specifically the first and second aspects of this invention. In the entire description of FIGS. 1 to 13, the means used to demodulate signals from active or passive electronic tags have not been represented, these means being well known by those skilled in the art.

Figure 1:
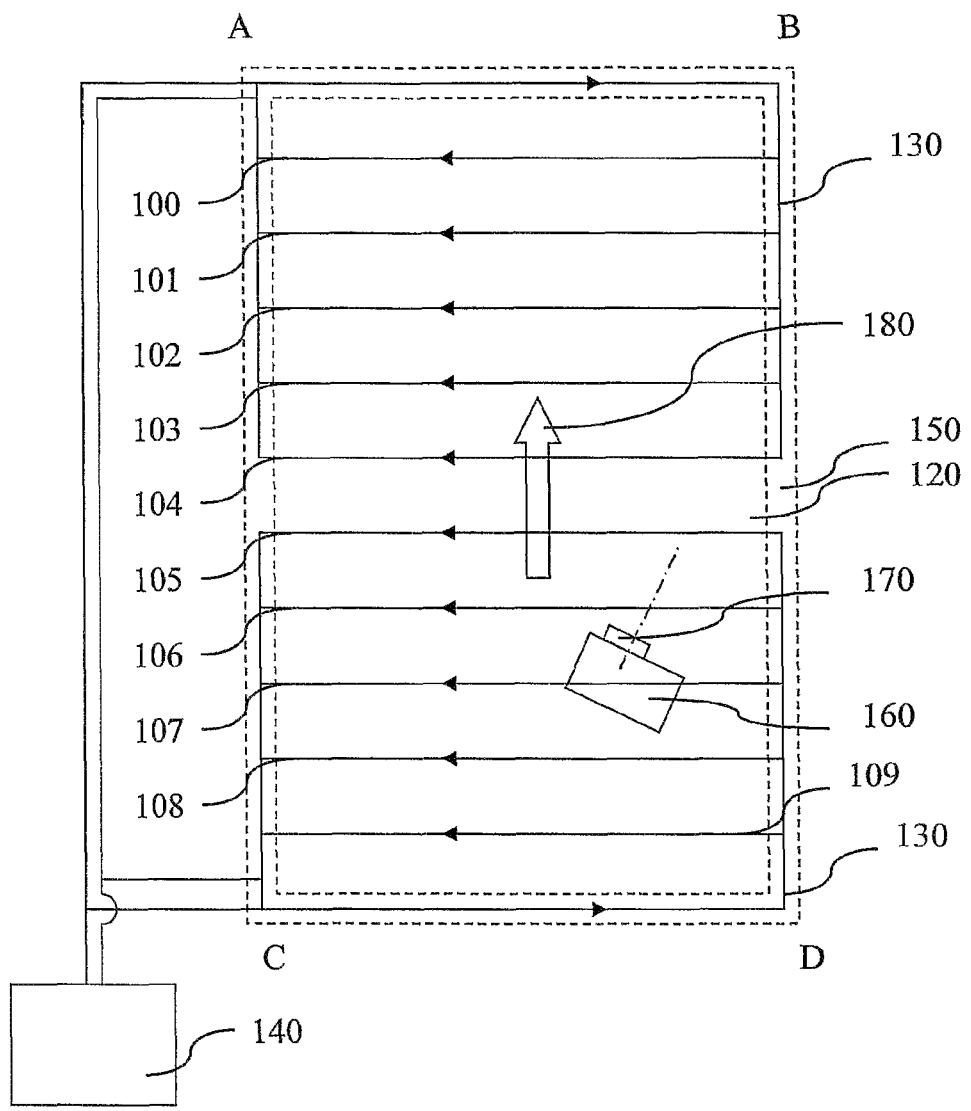
FIG. 1 is a diagrammatic plan view representation of a first mode of realization of an inductor according to this invention.

FIG. 1 shows first linear conductors 100 to 109 parallel to one another and distributed over a plane surface 120, connected together by connecting conductors 130 to form two electric circuit strands, the ends of said strands being connected to an electric power supply 140. The conductors are incorporated in a non-conducting solid base 150 which can accommodate articles 160 equipped with electronic tags 170 whose antenna is in a plane forming an angle of less than or equal to 45° with the axis of the first conductors.

When the electric power supply powers the circuit strands forming the first conductors, the electric current flows in the same direction in the first conductors, for example in the direction indicated by the arrows placed on the first conductors. The group of first conductors then generates a magnetic field, above surface 120, which is, at the centre of this surface, parallel to the arrow 180.

The electric current flowing through the top strand therefore passes successively through the following points and first conductors: A, B, 100, A, B, 101, A, B, 102, A, B, 103, A, B, 104 and A. The bottom strand is symmetrical with the top strand.

The inductor illustrated in FIG. 1 therefore comprises a plurality of first conductors parallel to one another, at least three of the first conductors being substantially at the same distance from each other and distributed over a surface, and an electric power supply of the conductors which sends electric current in the same direction through the conductors.

In the first mode of realization, illustrated in FIG. 1, the first conductors are linear and uniformly distributed over the surface 120, which is plane and the connecting conductors are formed from turns partially superimposed over the first conductors, on each half of the surface 120.

In variants, the first conductors are not uniformly distributed over the surface 120 (see the second and fourth modes of realization), are not linear, are not coplanar and/or do not form turns with the connecting conductors (see the third and fourth modes of realization).

Figure 2:
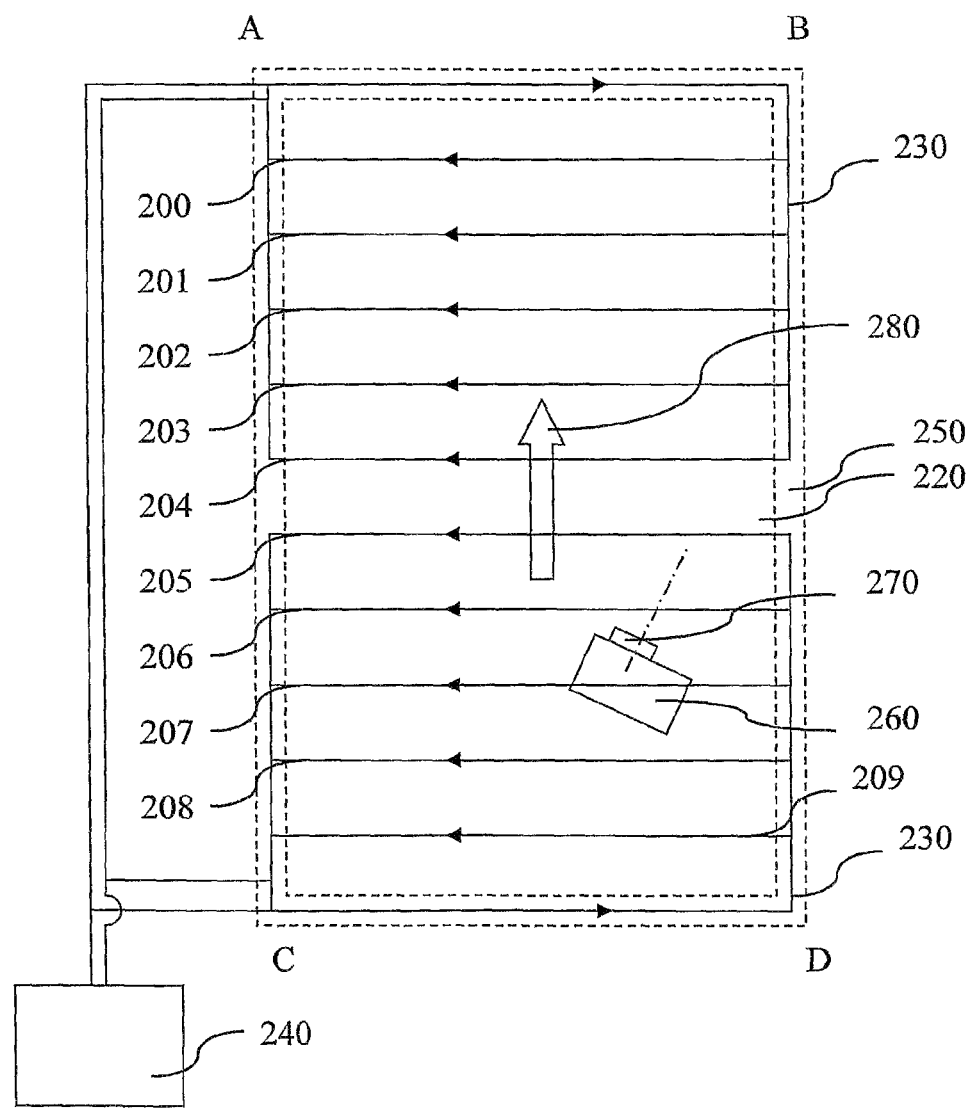
FIG. 2 is a diagrammatic plan view representation of a second mode of realization of an inductor according to this invention.

FIG. 2 shows first linear conductors 200 to 209 parallel to one another and distributed, in groups, over a plane surface 220, connected together by connecting conductors 230 to form two electric circuit strands, the ends of said strands being connected to an electric power supply 240. The conductors are incorporated in a non-conducting solid base 250 which can accommodate articles 260 equipped with electronic tags 270 whose antenna is in a plane forming an angle of less than or equal to 45° with the axis of the first conductors.

When the electric power supply powers the circuit strands forming the first conductors, the electric current flows in the same direction in the first conductors, for example in the direction indicated by the arrows placed on the first conductors. The group of first conductors then generates a magnetic field, above surface 220, which is, at the centre of this surface, parallel to the arrow 280.

The electric current flowing through the top strand therefore passes successively through the following points and first conductors: A, B, 200, A, B, 200, A, B, 200, A, B, 200, A, B, 201, A, B, 201, A, B, 201, A, B, 202, A, B, 202, A, B, 202, A, B, 203, A, B, 203, A, B, 204, A, B, 204 and A. The bottom strand is symmetrical with the top strand.

The inductor illustrated in FIG. 2 therefore comprises a plurality of first conductors parallel to one another, at least three of the first conductors being substantially at the same distance from each other and distributed over a surface, and an electric power supply of the conductors which sends electric current in the same direction through the conductors.

In the second mode of realization, illustrated in FIG. 2, the first conductors are grouped such that, near the edges of the surface 220 and connecting conductors forming turns, the number of first conductors is higher than towards the centre of the surface 220. In other words, the first conductors are more densely distributed at the ends of the surface comprising them and less densely distributed at the centre of the surface comprising them.

In the example shown in FIG. 2, four first conductors are grouped to form the smallest turns, then three conductors are grouped to form the next turns, then three conductors are grouped to form the next turns, then two conductors are grouped to form the other turns.

This configuration in groups makes the magnetic field more uniform near the surface 220 than near the surface 120.

In the second mode of realization, the first conductors are linear and distributed over the surface 220, which is plane and the connecting conductors are formed from turns partially superimposed over the first conductors, on each half of the surface 220.

In variants, the first conductors are uniformly distributed over the surface 220 (see the first and third modes of realization), are not linear, are not coplanar and/or do not form turns with the connecting conductors (see the third and fourth modes of realization).

Figure 4:
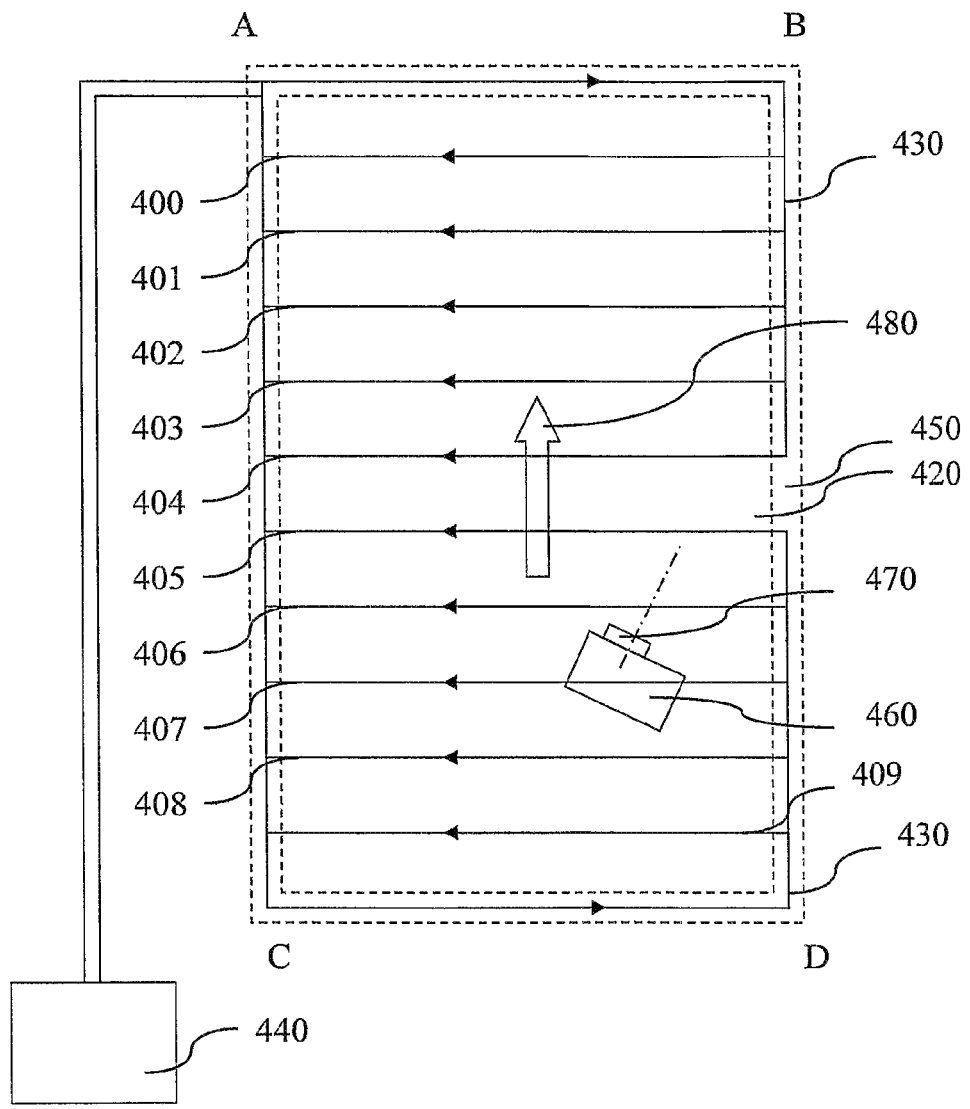
FIG. 4 is a diagrammatic representation, in plan view, of a third mode of realization of an inductor according to this invention.
Figure 5:
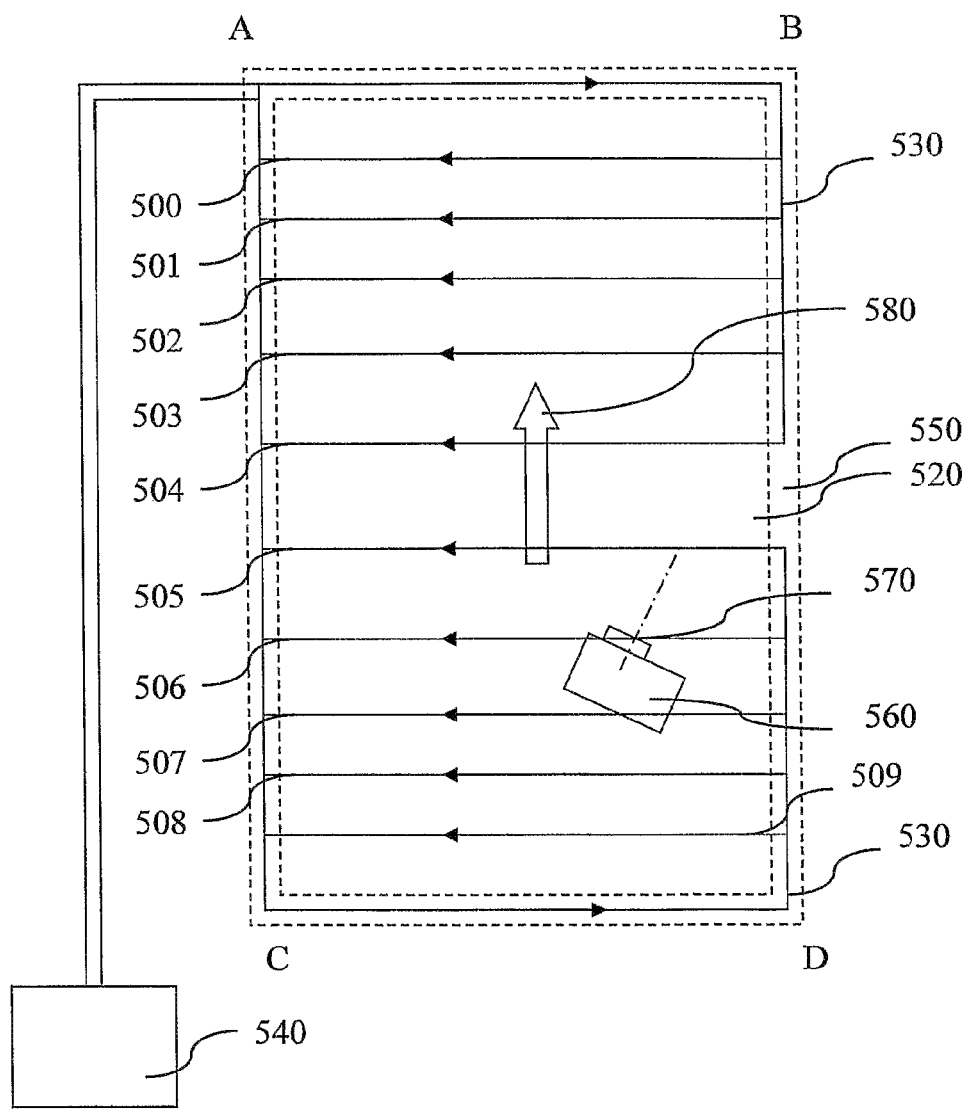
FIG. 5 is a diagrammatic representation, in plan view, of a fourth mode of realization of an inductor according to this invention.

Compared with the third and fourth modes of realization illustrated in FIGS. 4 and 5, the length of connecting conductors implemented in the first and second modes of realization is shorter, keeping the same dimensions of the surface 220.

Concerning the first and second modes of realization, due to their symmetry, the electromagnetic coupling of the top and bottom strands is only slight, thereby reducing energy losses.

Figure 3:
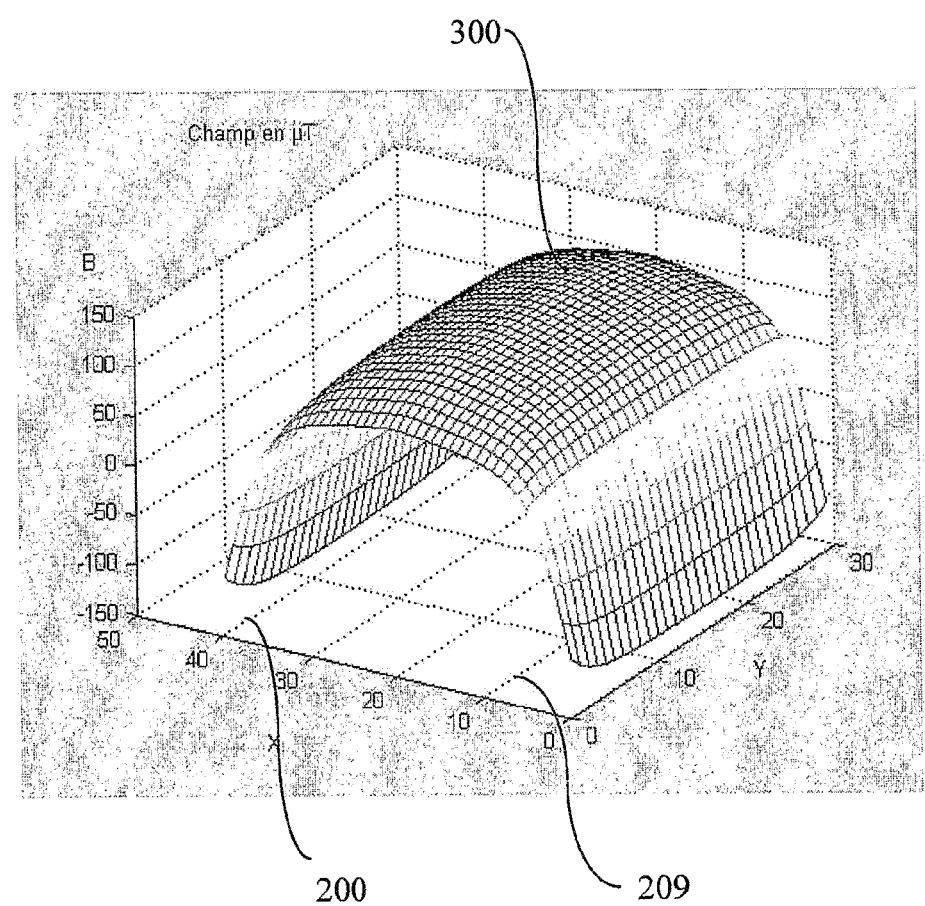
FIG. 3 is a diagrammatic representation, in perspective, of the intensity of a magnetic field generated by the second mode of realization of this invention, as illustrated in FIG. 2.

FIG. 3 shows, in a 3D view, the intensity 300 of the magnetic field component along the X-axis, i.e. the axis parallel to the surface comprising the first conductors and perpendicular to these first conductors. This intensity, represented by the height, i.e. on the B-axis, is given for each point of the surface 220, represented on the X- and Y-axes, at a constant distance from the surface 220.

We see that the magnetic field intensity is substantially uniform over a large part of the surface 220. For example, the line of intensities equal to half the maximum intensity reaches all the first conductors.

FIG. 4 shows first linear conductors 400 to 409 parallel to one another and distributed over a plane surface 420, connected together by connecting conductors 430 to form one electric circuit strand, the ends of said strand being connected to an electric power supply 440. The conductors are incorporated in a non-conducting solid base 450 which can accommodate articles 460 equipped with electronic tags 470 whose antenna is in a plane forming an angle of less than or equal to 45° with the axis of the first conductors.

When the electric power supply powers the circuit strand forming the first conductors, the electric current flows in the same direction in the first conductors, for example in the direction indicated by the arrows placed on the first conductors. The group of first conductors then generates a magnetic field, above surface 420, which is, at the centre of this surface, parallel to the arrow 480.

The electric current flowing through the strand therefore passes successively through the following points and first conductors: A, B, 400, C, D, 409, A, B, 401, C, D, 408, A, B, 402, C, D, 407, A, B, 403, C, D, 406, A, B, 404, C, D, 405 and A.

The inductor illustrated in FIG. 4 therefore comprises a plurality of first conductors parallel to one another, at least three of the first conductors being substantially at the same distance from each other and distributed over a surface, and an electric power supply of the conductors which sends electric current in the same direction through the conductors.

In the third mode of realization, illustrated in FIG. 4, the first conductors are linear and uniformly distributed over the surface 420, which is plane and the connecting conductors are alternately connected to the ends of the surface such that they do not form turns partially superimposed over the first conductors.

In variants, the first conductors are not uniformly distributed over the surface 420 (see the first, second and fourth modes of realization), are not linear, are not coplanar and/or form turns with the connecting conductors (see the first and second modes of realization).

FIG. 5 shows first linear conductors 500 to 509 parallel to one another and distributed over a plane surface 520, connected together by connecting conductors 530 to form one electric circuit strand, the ends of said strand being connected to an electric power supply 540. The conductors are incorporated in a non-conducting solid base 550 which can accommodate articles 560 equipped with electronic tags 570 whose antenna is in a plane forming an angle of less than or equal to 45° with the axis of the first conductors.

When the electric power supply powers the circuit strand forming the first conductors, the electric current flows in the same direction in the first conductors, for example in the direction indicated by the arrows placed on the first conductors. The group of first conductors then generates a magnetic field, above surface 520, which is, at the centre of this surface, parallel to the arrow 580.

The electric current flowing through the strand therefore passes successively through the following points and first conductors: A, B, 500, C, D, 509, A, B, 501, C, D, 508, A, B, 502, C, D, 507, A, B, 503, C, D, 506, A, B, 504, C, D, 505 and A.

The inductor illustrated in FIG. 5 therefore comprises a plurality of first conductors parallel to one another, at least three of the first conductors being substantially at the same distance from each other and distributed over a surface, and an electric power supply of the conductors which sends electric current in the same direction through the conductors.

In the fourth mode of realization, illustrated in FIG. 5, the first conductors are linear, are not uniformly distributed over the surface 520, which is plane and the connecting conductors are alternately connected to the ends of the surface such that they do not form turns partially superimposed over the first conductors.

In the fourth mode of realization, illustrated in FIG. 5, the first conductors are closer to one another near the edges of the surface 520 and farther away from one another other towards the centre of the surface 520. In other words, the first conductors are more densely distributed at the ends of the surface comprising them and less densely distributed at the centre of the surface comprising them.

The third and fourth modes of realization, illustrated in FIGS. 4 and 5, offer the advantage of having low inductance with respect to the first and second modes of realization illustrated in FIGS. 1 and 2.

In variants, the first conductors are uniformly distributed over the surface 520 (see the first and third modes of realization), are not linear, are not coplanar and/or form turns with the connecting conductors (see the first and second modes of realization).

We see that, in the modes of realization where the connecting conductors form turns with the first conductors, the first conductors may, as in the mode of realization illustrated in FIG. 5, be separated from one another by variable distances, preferably more reduced at the ends of the surface that at its centre.

Inversely, in the modes of realization where the connecting conductors do not form turns with the first conductors, the first conductors may, as in the mode of realization illustrated in FIG. 2, be grouped together with variable numbers of first conductors per group, preferably higher at the ends of the surface that at its centre.

Figure 6:
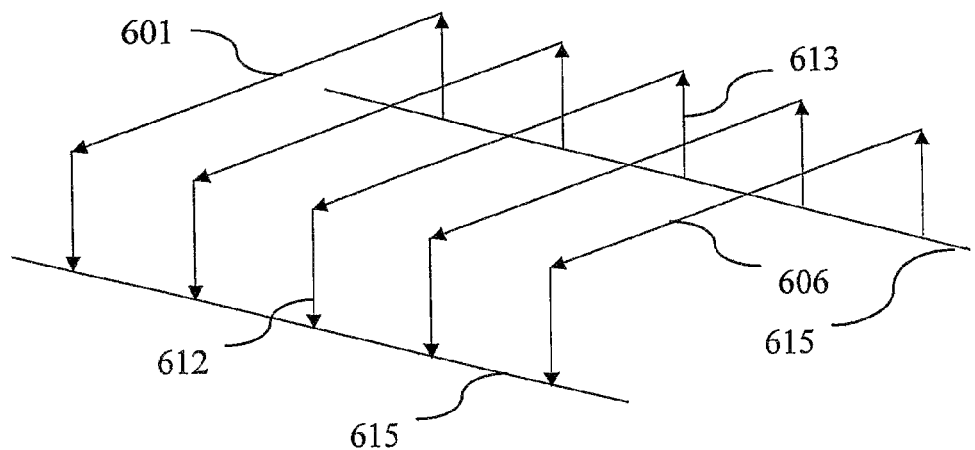
FIG. 6 is a diagrammatic representation, in perspective, of a fifth mode of realization of an inductor according to this invention.

FIG. 6 shows the first conductors (only the first conductors 601 to 606 are shown), connected by connecting conductors 612, 613 and 615. The first conductors are in one of the configurations illustrated in FIG. 1, 2, 4 or 5, or in one of their variants. The connecting conductors 612, 613 and 615 are on the same side of a plane comprising the first conductors. The connecting conductors have two linear parts, each side of the first conductors, respectively 612 and 613. The linear parts 612 are coplanar and the linear parts 613 are coplanar.

When an electric current is flowing through these parts 612 and 613, they generate underneath the first conductors a magnetic field parallel to the magnetic field generated by the electric current flowing through the first conductors. The total magnetic field is therefore increased opposite the ends of the first conductors.

Figure 7:
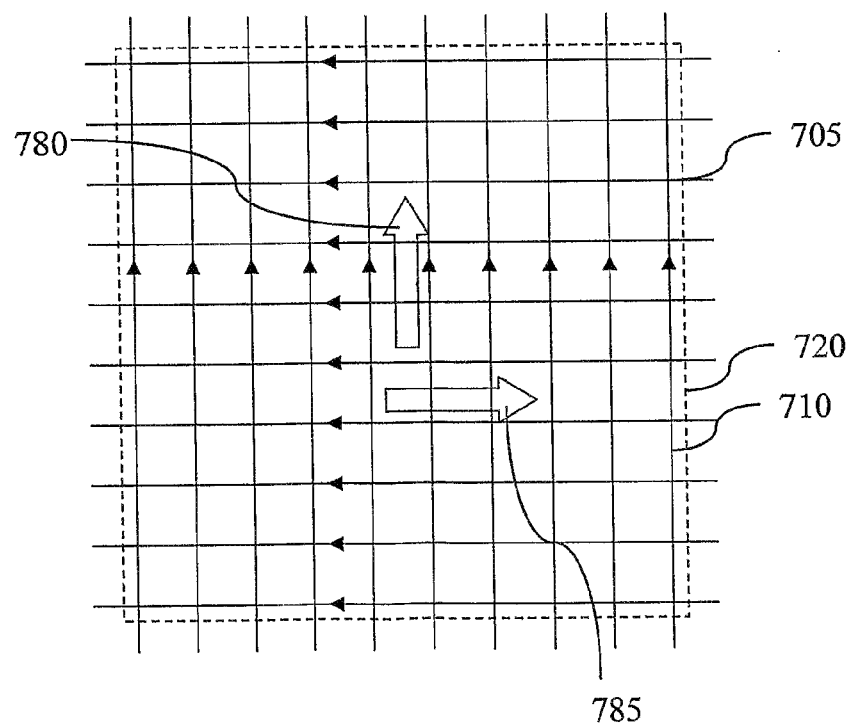
FIG. 7 is a diagrammatic representation, in plan view, of a sixth mode of realization of an inductor according to this invention.

FIG. 7 shows that, in a surface 720, first conductors 705, parallel to one another, with current flowing through them in the same direction when powered by the electric power supply (not shown) and second conductors 710, parallel to one another, with current flowing through them in the same direction when powered by the electric power supply, the second conductors being perpendicular to the first conductors and coplanar with them.

The electric power supply is adapted to generate a current alternately on the first and second conductors, thereby alternately generating, above the surface 720, magnetic fields illustrated by arrows 780 and 785, respectively.

Electronic tags whose antennae are perpendicular to the surface 720 can therefore always be read, when the first conductors 705 are powered and/or when the second conductors 710 are powered.

Figure 8:
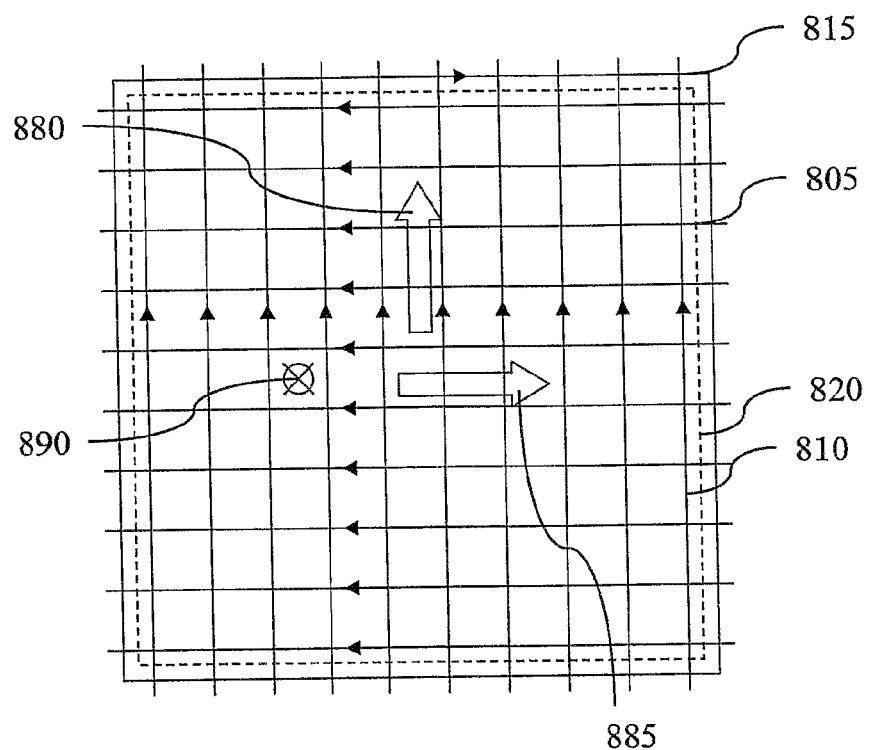
FIG. 8 is a diagrammatic representation, in plan view, of a seventh mode of realization of an inductor according to this invention.

FIG. 8 shows that, in a surface 820, first conductors 805, parallel to one another, with current flowing through them in the same direction when powered by the electric power supply (not shown) and second conductors 810, parallel to one another, with current flowing through them in the same direction when powered by the electric power supply, the second conductors being perpendicular to the first conductors and coplanar with them.

Third conductors 815 forming square turns powered by the electric power supply are located around the surface 820.

The electric power supply is adapted to generate a current alternately on the first, second and third conductors, thereby alternately generating, above the surface 820, magnetic fields illustrated by arrows 880, 885 and 890, respectively.

Irrespective of their antenna orientations, electronic tags can therefore always be read, when the first conductors 805 are powered, when the second conductors 810 are powered and/or when the third conductors 815 are powered.

The mode of realization illustrated in FIG. 8 can be used to produce a "3D" reader since the tags can be read irrespective of their orientation or their position on the surface 820. This reader is very flat and can easily be included in various supports (in particular tables, shelves, partitions for stock management, etc.).

Concerning the modes of realization illustrated in FIGS. 7 and 8, due to their symmetry, the strands comprising the first, second and possibly third conductors are not electromagnetically coupled. Consequently, there is no energy loss when associating these three types of antenna.

The various modes of realization of this invention are highly adapted to identification of stacks of a large number of tags (especially tags not operating by resonance) which are parallel and very close to each other. The comb structure due to its highly uniform field allows optimum coupling of the energy to a stack of tags, even very compact. The reader described above can be used to identify a stack of 40 tags. A figure-8 shaped reader of the same area cannot offer this type of performance.

In the remainder of the description, the seventh mode of realization of the inductor illustrated in FIG. 8 has been represented. However, this mode of realization is only given as an example, the other modes of realization and their variants can be integrated in a similar manner in pallets, containers, conveyors, cash registers or base stations.

Figure 9:
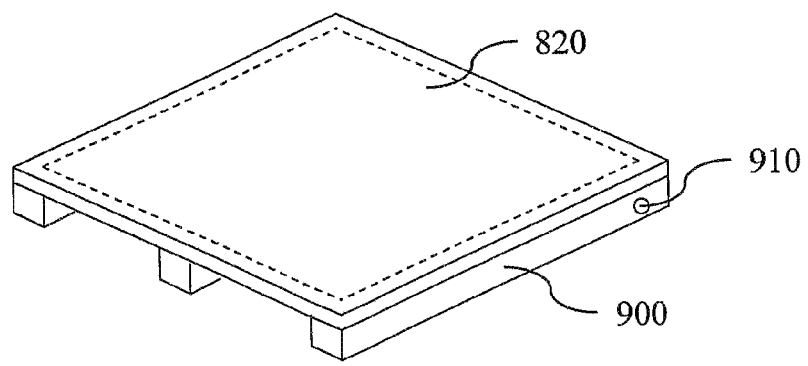
FIG. 9 is a diagrammatic representation, in perspective, of a pallet according to this invention.

FIG. 9 shows a pallet 900 comprising, in its top surface, a surface 820 equipped with the first, second and third conductors and connected to the exterior of the pallet 900 by a connector 910 allowing an external electric power supply to power alternately these first, second and third conductors.

The advantage of this pallet 900 is that the tags of the objects it supports can be read, without having to move them between antennas of a base station.

Figure 10:
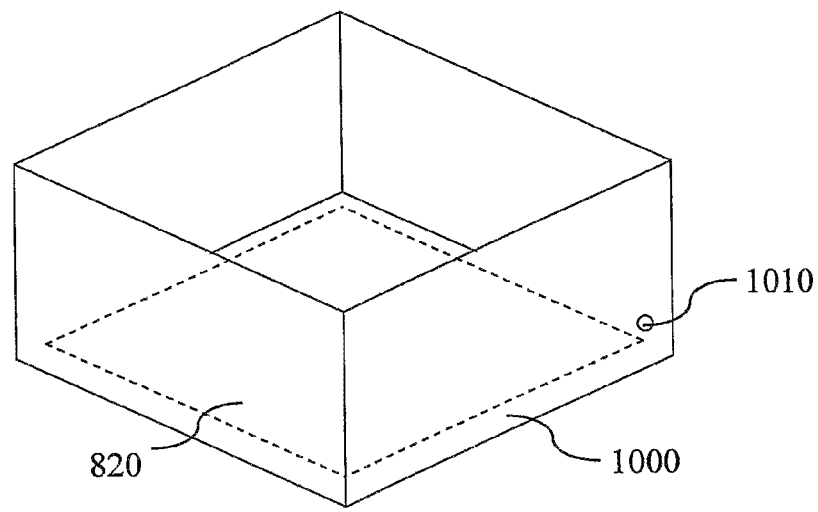
FIG. 10 is a diagrammatic representation, in perspective, of a container according to this invention.

FIG. 10 shows a container or a box 1000 comprising, in its bottom surface, a surface 820 equipped with the first, second and third conductors and connected to the exterior of the container 1000 by a connector 1010 allowing an external electric power supply to power alternately these first, second and third conductors.

The advantage of this container 1000 is that the tags of the objects it contains can be read, without having to move them between antennas of a base station.

Figure 11:
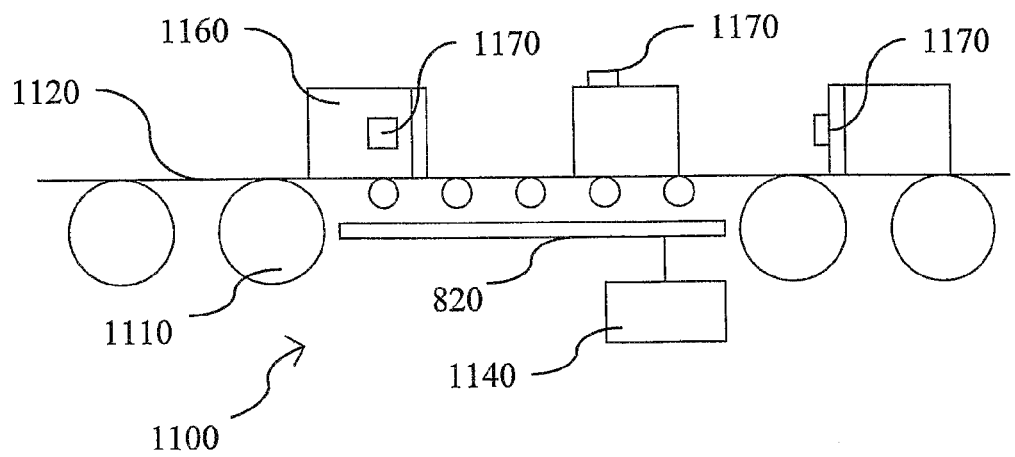
FIG. 11 is a diagrammatic representation, in cross-section, of a conveyor according to this invention.

FIG. 11 shows a conveyor 1100 comprising, underneath its conveying surface, in this case represented by rollers 1110 supporting a flexible belt 1120, a surface 820 equipped with the first, second and third conductors and connected to an electric power supply 1140 which powers alternately these first, second and third conductors.

The advantage of this conveyor 1100 is that the tags 1170 of the objects 1160 it carries can be read, irrespective of the orientation of their antennas and without obstructing the passage of these objects 1160.

Figure 12:
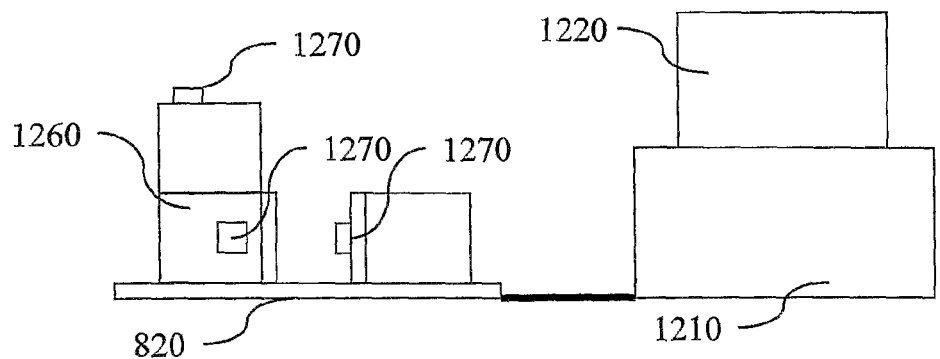
FIG. 12 is a diagrammatic representation, in cross-section, of a cash register according to this invention.

FIG. 12 shows a cash register 1210 comprising a display screen 1220 and connected to a base comprising a surface 820 equipped with the first, second and third conductors and connected to an electric power supply (not shown) incorporated in the cash register, which powers alternately these first, second and third conductors.

The advantage of this cash register 1210 is that the tags 1270 of the objects 1260 placed on the base can be read, irrespective of the orientation of their antennas and without restricting the size of these objects to particular dimensions.

This invention therefore allows automatic identification of stacked products, especially at the checkout of a store.

Figure 13:
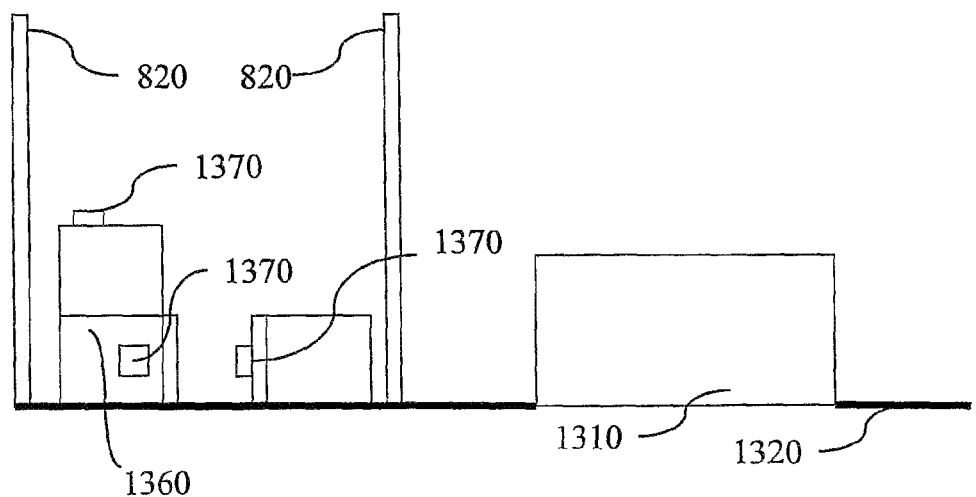
FIG. 13 is a diagrammatic representation, in cross-section, of a base station according to this invention.

FIG. 13 shows a base station 1310 connected to two vertical surfaces 820 each equipped with first, second and third conductors and connected to an electric power supply (not shown) incorporated in the base station, which powers alternately these first, second and third conductors in a correlated manner, so that the magnetic field between the surfaces 820 is as uniform as possible.

The advantage of this base station 1310 is that the tags 1370 of the objects 1360 between the surfaces 820 can be read, irrespective of the orientation of their antennas or their position between the surfaces 820.

This invention can therefore be used to produce different shapes of support comprising the inductor subject of this invention. Since this support, used to read electronic tags whose antenna is oriented in any direction, offers the significant advantage of being very flat, it can be placed on or incorporated in any work surface, counter, table, tray or shelf.

This invention is not limited to the modes of realization described and represented or to their variants, but, quite on the contrary, can be extended to the modes of realization of this invention within the grasp of those skilled in the art.

When used with a signal frequency of 125 kHz crossing the conductors, single-conductor standard building wire of cross-section 1 mm$^2$ can be used to form the conductors in order to minimize the skin effect at said frequency.

We observe that the inductor subject of this invention is especially intended to operate with frequencies below 30 MHz.

Figure 14:
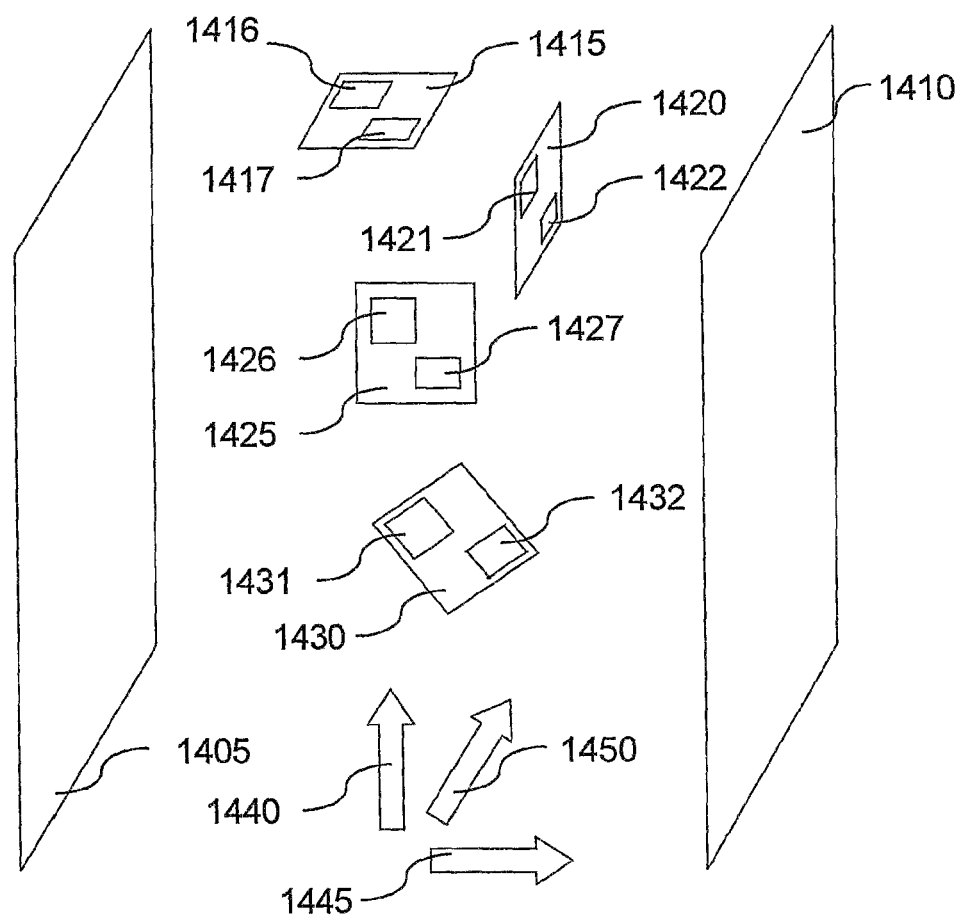
FIG. 14 is a diagrammatic representation of an example of implementation of this invention in a radio frequency electronic tag reading system.

FIGS. 14 to 17 concern more specifically the third to fifth aspects of this invention. FIG. 14 shows a group of antennae 1405 and 1410 of a base station (not shown) and passive electronic tags 1415, 1420, 1425 and 1430 placed between the group of antennae 1405 and 1410. The base station successively powers the antennae of the group of antennae 1405 and 1410 to successively generate, during a read cycle, a vertical magnetic field symbolized by the arrow 1440, a lateral magnetic field symbolized by the arrow 1445 and a longitudinal magnetic field symbolized by the arrow 1450.

The electronic tags are powered by the electromagnetic field generated by the group of antennae 1405 and 1410 when their antenna planes cut a sufficient number of magnetic field lines.

In the configuration shown, the electronic tag 1415 is powered by the magnetic field 1440, tag 1420 by the magnetic field 1445, tag 1425 by the magnetic field 1450 and tag 1430 by each of the magnetic fields 1440, 1445 and 1450.

Each of the tags 1415, 1420, 1425 and 1430 comprises a communication means, respectively 1416, 1421, 1426 and 1431, to communicate with the base station and an extended inhibition means, respectively 1417, 1422, 1427 and 1432.

The communication means are adapted to reply to requests transmitted, via successive magnetic fields, by the base station in order to be identified by this base station. The extended inhibition means 1417, 1422, 1427 and 1432 are adapted to inhibit the reply to the query requests when the corresponding tag has been fully identified, for a duration of at least one complete read cycle, even when the corresponding electronic tag is not powered by a magnetic field, such that there is no risk of an electronic tag being successively identified by magnetic fields successively generated by the group of antennae 1405 and 1410.

Thanks to this essential feature, each electronic tag can only be read once per read cycle, which significantly increases the number of electronic tags that can be identified per unit time.

On the contrary, in the prior art, when they were no longer powered, the tags were quickly no longer inhibited and replied to the identification requests from the base station as soon as they were powered again, resulting in a plurality of successive identifications of the same electronic tag during a given read cycle and therefore a loss of time and reduced identification rate.

In fact, apart from the special orientations of the electronic tags 1415, 1420 and 1425, since the electronic tags are randomly oriented, they can be read by several magnetic fields, which is the case for electronic tag 1430.

Figure 15A:
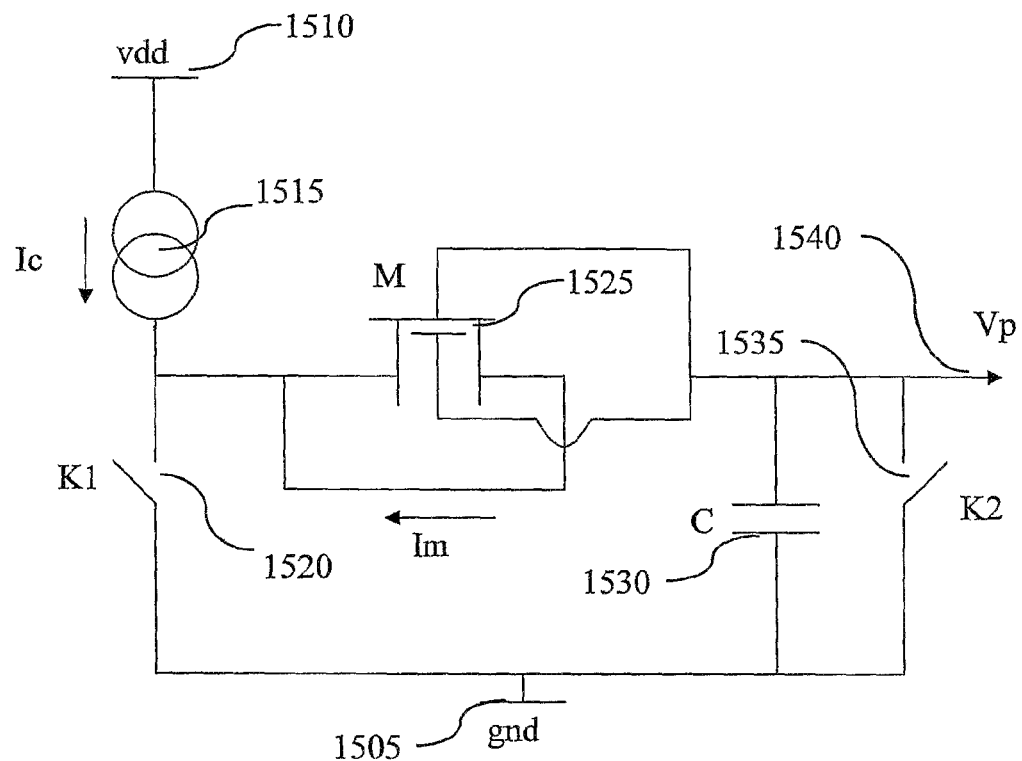
FIGS. 15A and 15B represent an electronic circuit integrated in an electronic tag.
Figure 15B:
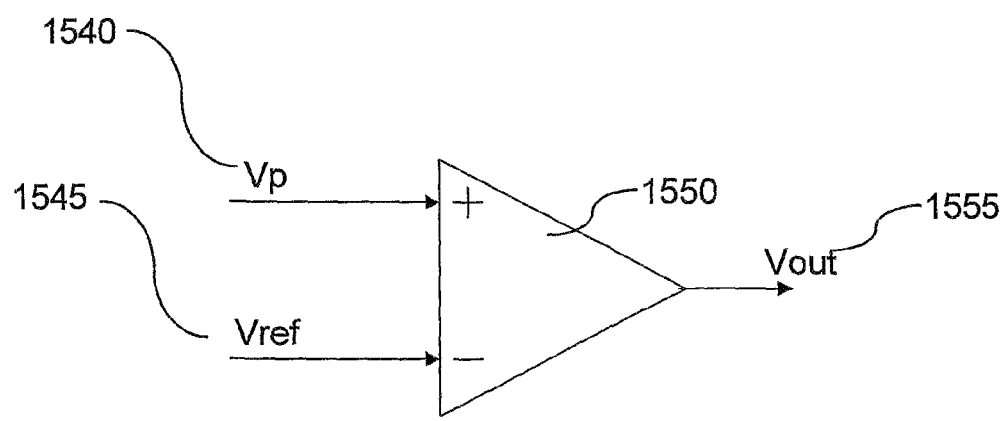

FIGS. 15A and 15B show the assembly of a MOS transistor 1525 mounted as a diode, i.e. the drain is connected to the source and the gate is connected to the substrate.

On power up, switch K1 1520 is closed, capacitor C 1530 is discharged. As soon as the tag is identified, switch K1 1520 closes allowing capacitor C 1530 to charge, across transistor 1525, at constant current generated by the current source Ic 1515.

Switch K2 1535 can be used at any time to reset the extended inhibition information stored in the capacitor 1530, i.e. exit the extended inhibition state.

The level stored in capacitor C 1530 is present at point Vp 1540 in order to compare the potential Vp 1540 with a fixed reference voltage Vref 1545. The signal present at output Vout 1555 of the comparator 1550 is the reshaping of the signal Vp 1540 and represents the extended inhibition state of the electronic tag.

Figure 16:
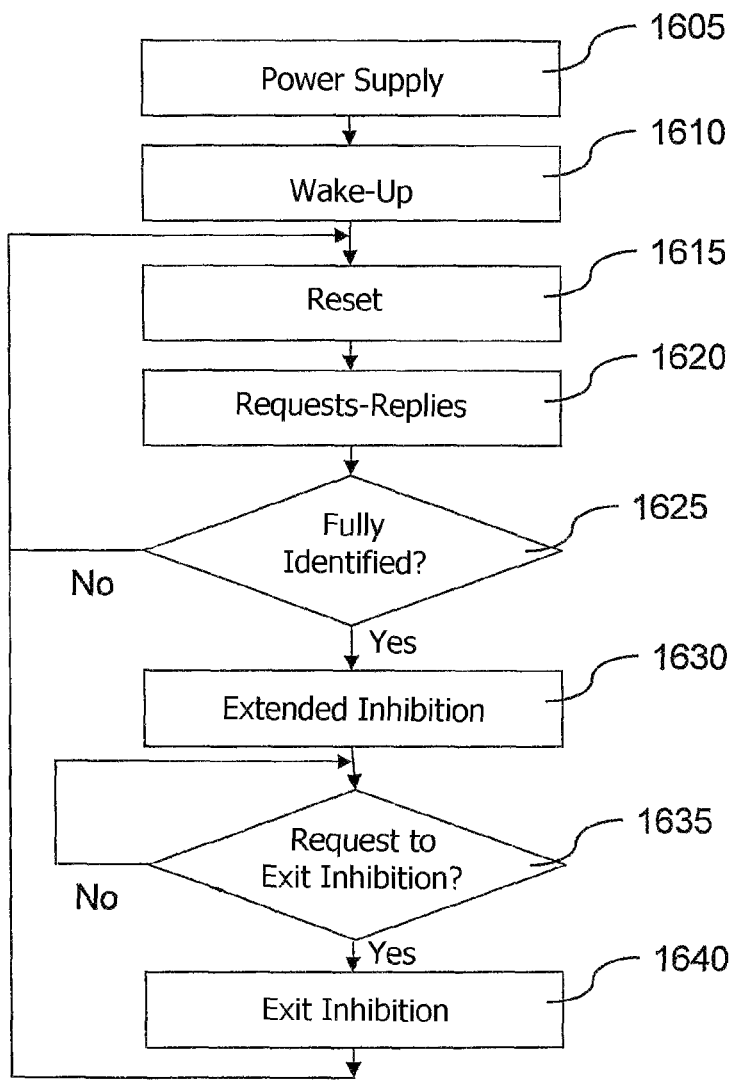
FIG. 16 represents a logic diagram showing the operation of an electronic tag.

FIG. 16 shows the steps involved in the operation of an electronic tag according to this invention.

The passive electronic tag wakes up when it receives a magnetic field strong enough to power it, step 1605.

During a step 1610, it initializes, for example by resetting counters. During a step 1615 it receives a reset signal from a base station, via a read magnetic field, generally identical to the power electric field.

During a step 1620, it replies to the requests transmitted by the base station and supplies its identification, in one or more parts. Possibly, during this step 1620, it becomes temporarily inhibited so as not to reply to requests concerning the identification of other electronic tags.

During a step 1625, the electronic tag determines whether it has been fully identified, either according to the replies it has transmitted, or after reception of an acknowledgement of receipt signal from the base station, for example as a single pulse or as a message repeating the entire identification of the tag concerned.

If the result of step 1625 is negative, which may, for example, happen if the tag did not correctly receive all the requests transmitted for its attention by the base station or if the base station did not correctly receive the replies transmitted by the electronic tag, the tag returns to step 1615 and waits for a new reset request.

If the result of step 1625 is positive, during a step 1630, the electronic tag switches into extended inhibition until it receives a request to exit extended inhibition, step 1635 or until its extended inhibition means can no longer maintain the extended inhibition signal, this extended inhibition being able to last for a period of at least the duration of a said read cycle, even in the absence of any electric power supply from said base station.

If it receives a request to exit extended inhibition, the electronic tag exits extended inhibition state, step 1640 and returns to step 1615. If the energy stored by the inhibition means, for example by the capacitor 1530, is exhausted, the tag goes back to sleep until a step 1605 occurs.

Figure 17:
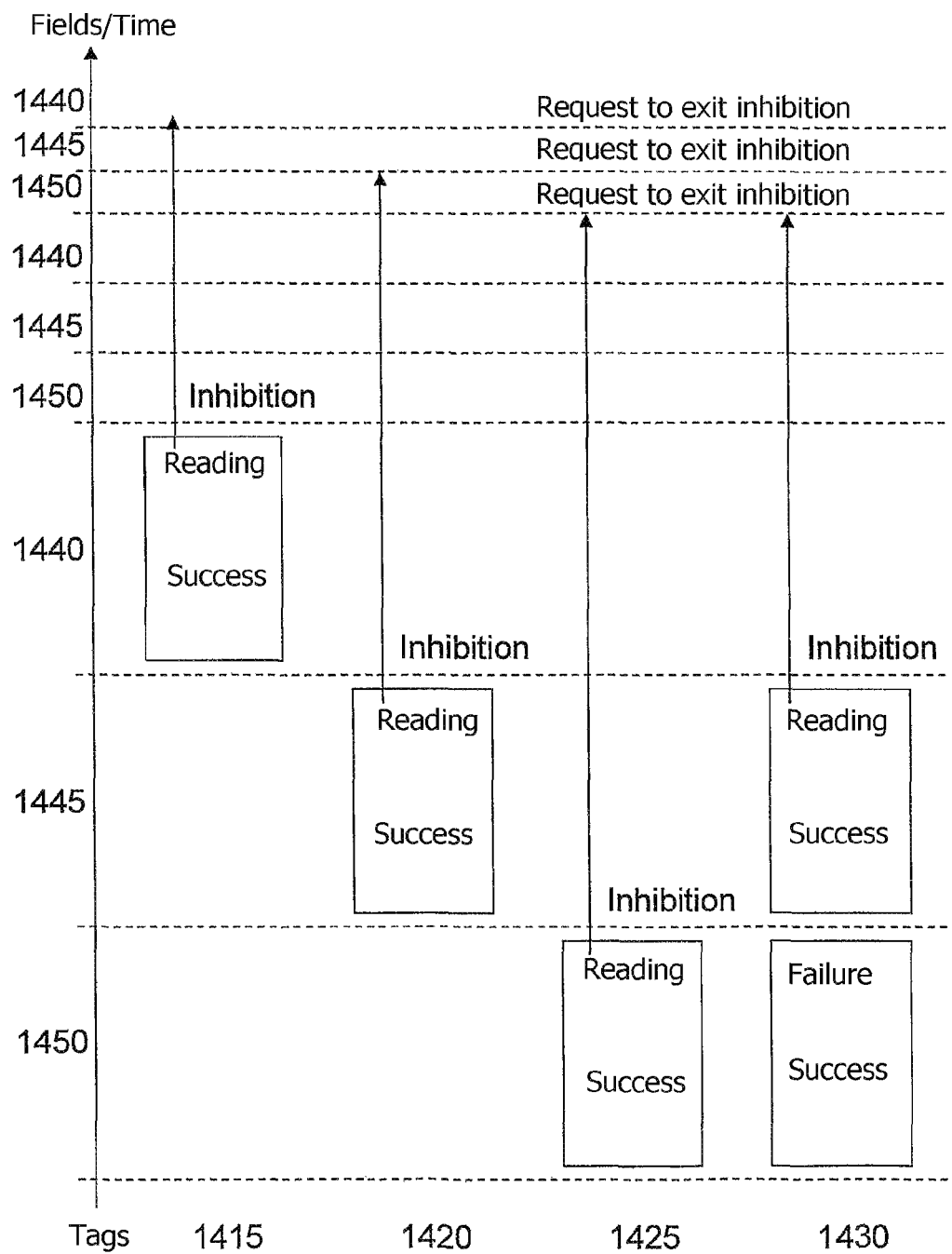
FIG. 17 represents a chronogram showing the operation of electronic tags.

FIG. 17 shows, successively, on a time axis from bottom to top, that the magnetic field 1450 is first transmitted to identify electronic tags within said field. During this phase of the read cycle, the electronic tag 1425 is fully identified and we assume in this case that the electronic tag 1430, powered by the magnetic field 1450, is not fully identified, for example because of its orientation or communication faults between it and the base station. The electronic tag 1425 then goes into extended inhibition state which may last for at least the duration of a complete read cycle implementing the various antenna combinations planned in this cycle.

Once the base station has identified the electronic tags capable of correctly communicating via the magnetic field 1450, the magnetic field 1445 is transmitted and the electronic tag 1420 is fully identified. Due to its extended inhibition, even if it is powered by the magnetic field 1445 and it receives the requests transmitted by the base station, the electronic tag 1425 does not reply to these requests nor to the reset transmitted by the base station.

We assume in this case that the electronic tag 1430 is also fully identified during the transmission phase of magnetic field 1445.

As soon as they are fully identified, the electronic tags 1420 and 1430 go into extended inhibition state which may last for at least the duration of a complete read cycle implementing the various antenna combinations planned in this cycle.

Once the base station has identified the electronic tags capable of correctly communicating via the magnetic field 1445, the magnetic field 1440 is transmitted and the electronic tag 1415 is fully identified. Due to their extended inhibition, even if they are powered by the magnetic field 1440 and they receive the requests transmitted by the base station, the electronic tags 1420, 1425 and 1430 do not reply to these requests nor to the reset transmitted by the base station.

As soon as it is fully identified, the electronic tag 1415 goes into extended inhibition state which may last for at least the duration of a complete read cycle implementing the various antenna combinations planned in this cycle.

We assume in this case that the base station does not transmit a request to exit extended inhibition as long as any tags remain to be identified. The base station therefore performs a new read cycle, successively implementing magnetic fields 1450, 1445 and 1440 and does not identify any new electronic tag.

The base station then transmits a request to exit extended inhibition, via each of the magnetic fields 1450, 1445 and 1440 and all tags exit extended inhibition and wait for a reset in order to reproduce a read cycle. This step of transmission of a request to exit extended inhibition is, for example, carried out to check that the electronic tags are still within the range of the base station or to deinhibit any electronic tag which could have come within the range of the base station in an extended inhibition state, for example under the effect of a read by another base station.

We observe that the tags exit extended inhibition state when they receive the exit request. Due to their special orientations therefore, the electronic tags 1420 and 1415 exit extended inhibition state later than the electronic tags 1425 and 1430.

Figure 18:
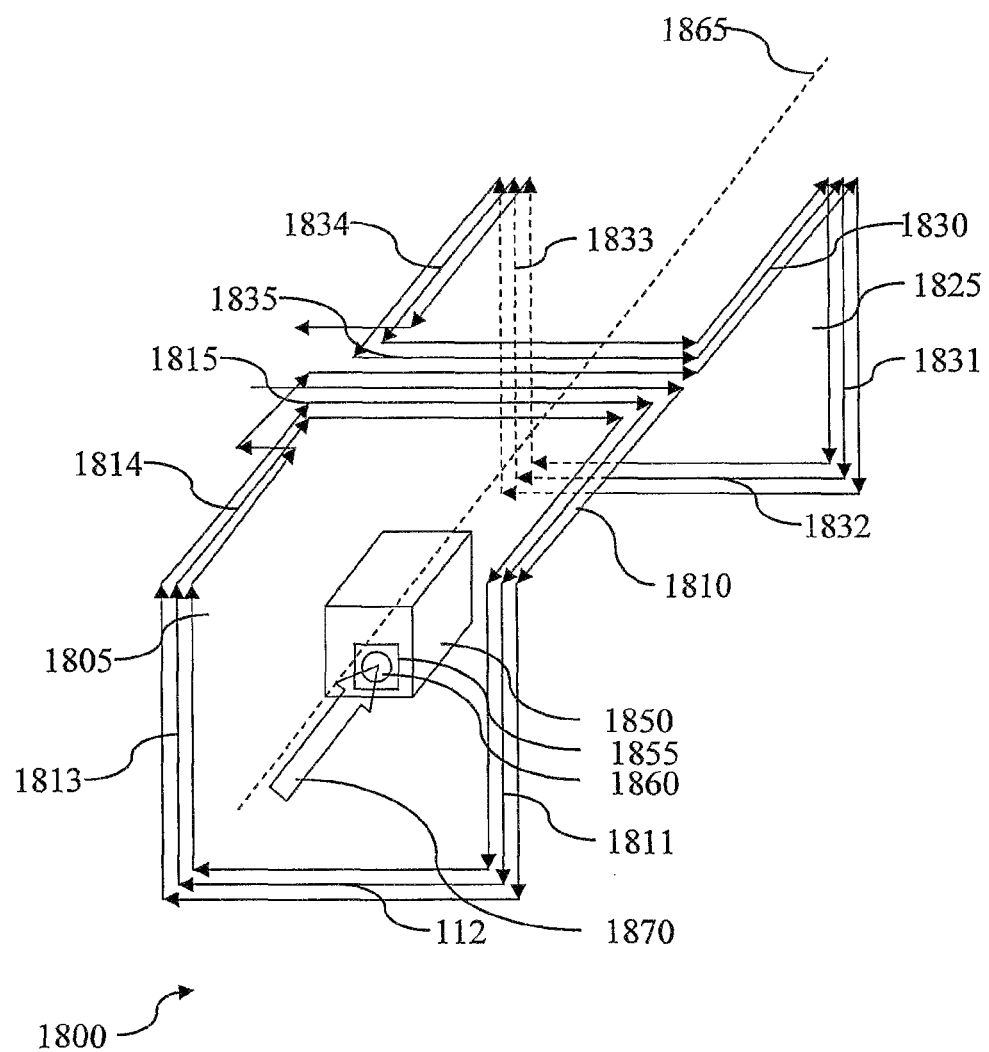
FIG. 18 is a diagrammatic representation, in perspective, of a special mode of realization of an inductor according to this invention.
Figure 19:
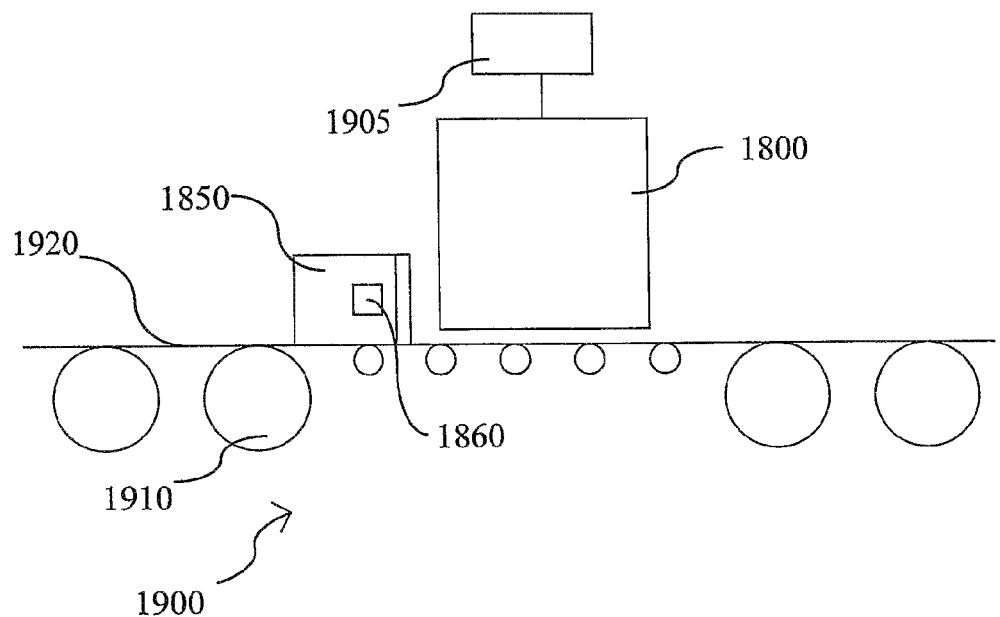
FIG. 19 is a diagrammatic representation, in side view, of a conveyor comprising an inductor illustrated in FIG. 18.
Figure 20:
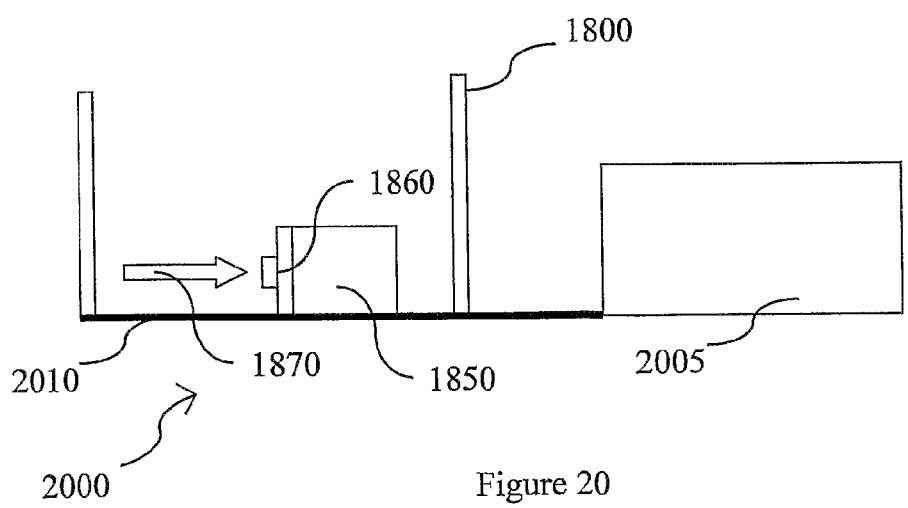
FIG. 20 is a diagrammatic representation, in side view, of a base station comprising an inductor illustrated in FIG. 18.

FIGS. 18 to 20 concern more specifically the sixth to eighth aspects of this invention. FIG. 18 shows an inductor 1800 comprising two strands 1805 and 1825 in the shape of non-planar loops and a product 1850 bearing an electronic tag 1855 comprising a plane antenna 1860. Each loop of the strand 1805 comprises, for each conductor, six line segments 1810 to 1815 and each loop of strand 1825 comprises, for each conductor, six line segments 1830 to 1835. The combination of the two strands 1805 and 1825 is made from a single conductor which successively goes through the loops 1805 and 1825. FIG. 18 only shows a given conductor going though the strand three times so that the figure remains clear. However, the number of times a conductor goes through each strand is preferably much higher in order to generate a very strong electromagnetic field.

In FIG. 18, the conductor first goes through strand 1805 three times then through strand 1825 three times. In variants, the conductor goes alternately through strands 1805 and 1825, for example to form a layer of conductors in one of the strands before forming a layer of conductors in the other strand before going to the next layer.

As we can easily understand, the current flows through the two strands in opposite directions of rotation, at all times. For example, in FIG. 18, when the current flows, as seen from above, in the clockwise direction on strand 1805, it flows in anticlockwise direction on strand 1825.

in FIG. 18, each non-planar loop of each strand is mostly contained in the junction of two orthogonal planes, one horizontal and the other vertical.

The product 1850 is of any type. It is associated with an electronic tag or transponder 1855, for example RFID type. The plane of the flat antenna 1860 of the electronic tag is oriented substantially parallel to the line segments 1811, 1812, 1813, 1815, 1831, 1832, 1833 and 1835 and substantially perpendicular to line segments 1810, 1814, 1830 and 1834. For example, the product 1850 is moved by a conveyor (see FIG. 19) or a conveyor belt parallel to segments 1812, 1815, 1832 and 1835 such that it passes through the arch formed by the inductor 1800.

The orientation of the axis of the antenna 1860 of each electronic tag 1855 is substantially parallel to an axis 1865 going through the two loops. The mutual inductance between the inductor 1800 and the antenna 1860 of the electronic tag 1855 is therefore high as the electronic tag 1855 goes through the arch formed by the inductor 1800, its antenna 1860 being substantially perpendicular to the field lines, illustrated by the arrow 1870.

FIG. 19 shows, in side view, a conveyor 1900 comprising an inductor 1800 as illustrated in FIG. 18 and electronic circuits 1905 to generate signals applied to the inductor 1800 and to process signals from the inductor 1800 to identify the electronic tags 1855 and the products 1850 and, possibly, write these electronic tags 1855 in memory.

The conveyor 1900 comprises, above its conveying surface, represented here by rollers 1910 supporting a flexible belt 1920, the inductor 1800. The conveyor carries the product 1850 such that the orientation of the axis of the antenna 1860 of each electronic tag 1855 is substantially parallel to an axis going through the two loops. The electronic tag 1855 is therefore read as it goes under the inductor 1800, its antenna 1860 then being substantially perpendicular to the field lines generated by the inductor 1800.

The advantage of this conveyor 1900 is that the tags 1855 of the products 1850 it carries can be read as they go under the inductor 1800.

FIG. 20 shows a base station 2000 comprising an inductor 1800 as illustrated in FIG. 18 and electronic circuits 2005 to generate signals applied to the inductor 1800 and to process signals from the inductor 1800 to identify the electronic tags 1855 and the products 1850 and, possibly, write these electronic tags 1855 in memory.

The base station 2000 comprises, underneath and around a support 2010 of products 1850, the inductor 1800 turned upwards. The products 1850 to be identified are positioned, for example by a warehouseman, a salesman, a customer or a security officer, on the support 2010 such that the orientation of the antenna 1860 axis of each electronic tag 1855 is substantially parallel to an axis going through the two loops. The electronic tag 1855 is therefore read when the products 1850 are placed on the support 2010 and above the inductor 1800, the antenna 1860 of the electronic tag 1855 then being substantially perpendicular to the field lines generated by the inductor 1800.

This invention can therefore be used to produce different shapes of support comprising the transducer subject of this invention. This support, used to read electronic tags whose antenna is oriented in any direction, offers the significant advantage that it can be incorporated in a work surface, a counter or a shelf.

This invention also allows automatic identification of stacked products whose electronic tag antennae are parallel.

This invention is not limited to the modes of realization described and represented or to their variants, but, quite on the contrary, can be extended to the modes of realization of this invention within the grasp of those skilled in the art.

Figure 21:
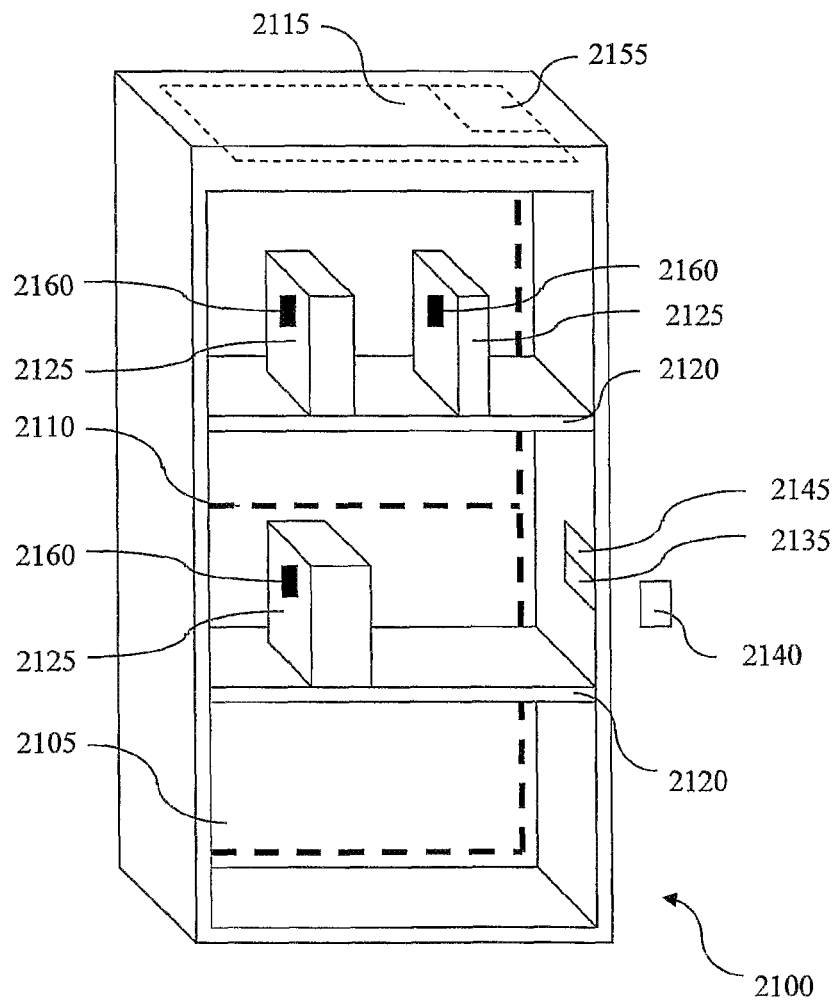
FIG. 21 is a diagrammatic representation of a first mode of realization of a rack according to this invention.

FIGS. 21 to 29 concern more specifically the ninth and tenth aspects of this invention. FIG. 21 shows a rack 2100 comprising, in or on its back wall 2105, an antenna 2110, in its upper part, electronic tags 2115, shelves 2120 supporting products 2125 equipped with electronic tags 2160, a communication means 2155, a reader 2135 to read an identification card 2140 and a display 2145.

The rack 2100 and the shelves 2120 are made from rigid materials, for example wood, glass or plastic.

The antenna 2110 is connected to the back wall 2105, for example by gluing, stapling or inclusion. The antenna 2110 has one of the antenna shapes illustrated in FIGS. 23 to 25.

The electronic tags 2160 and the electronic circuits 2115 are of type known in the field of radio frequency identification (RFID). They comprise, in a known manner, a signal generation circuit adapted to successively generate signals for each antenna or group of antennae incorporated in the rack (see also FIG. 22) and a signal reception circuit modulating said magnetic field.

The electronic circuits 2115 consist, for example, of a computer and circuits specific to the field of RFID electronic tags. They are adapted to supply to the antenna 2110, at predetermined times, a signal enabling it to generate an electromagnetic field. This electromagnetic field is used to power the electronic tags 2160 and transmit messages, requests or instructions to the tags 2160. The electronic circuits 2115 are also adapted to detect the signals transmitted by the electronic tags 2160, by modulation of the magnetic field transmitted by the antenna 2110, to process these signals, to identify the electronic tags and to transmit these identifiers to the communication means 2155.

The electronic circuits 2115 are also adapted to process the signals from the card 2140 reader 2135 to identify a user and command the contents of the display 2145.

Figure 27A:
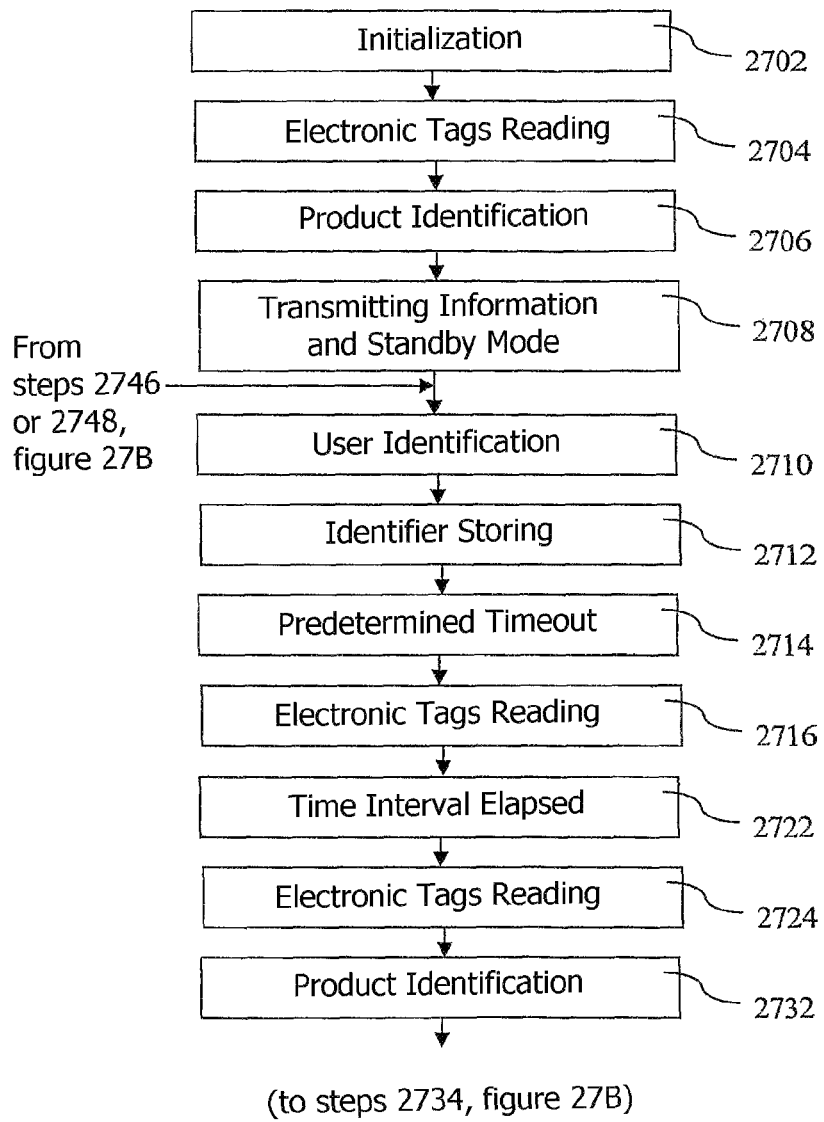
FIGS. 27A and 27B represent, as a logic diagram, the operation on a rack as illustrated in FIG. 21 or 22.
Figure 27B:
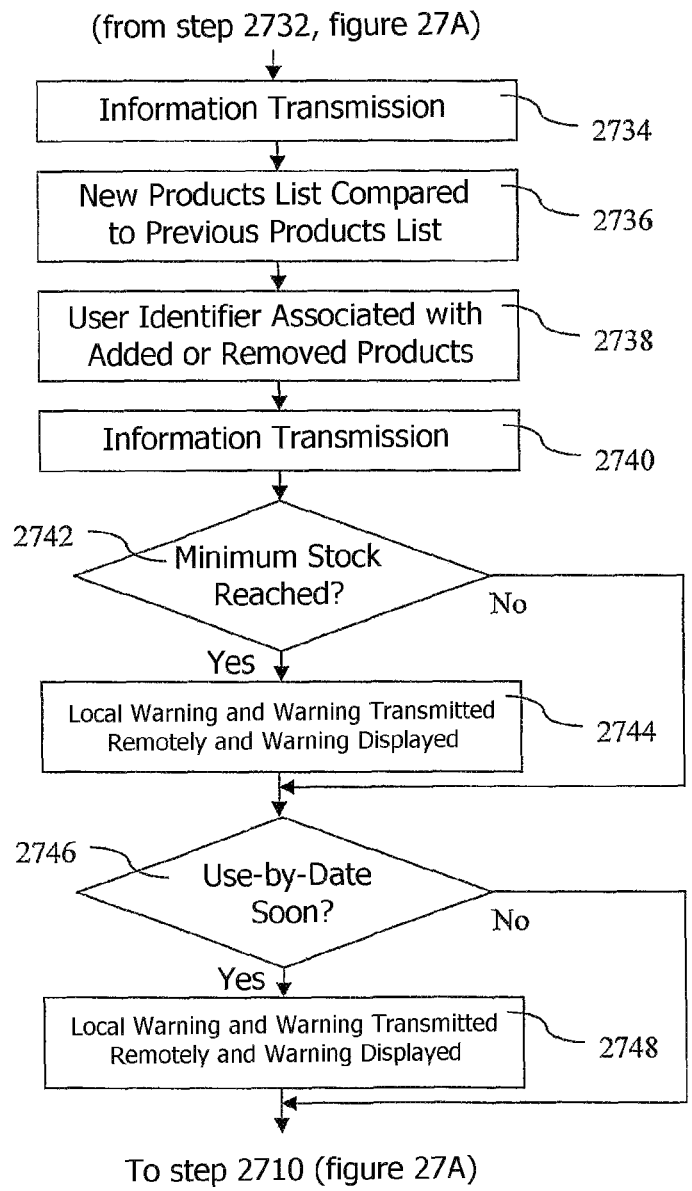

The operation of the electronic circuits 2115 is detailed with reference to FIG. 27.

The communication means 2155 allows remote communication with a computer, a server or a computer system comprising a network, according to known techniques, on wired or wireless support. The communication means 2155 is, for example, a modem.

The identification card 2140 reader 2135 is, for example, of type known in the field of radio frequency identification. In this case, each card 2140 comprises a transponder, or electronic tag and the reader 2135 comprises an antenna for transmission and reception of magnetic fields modulated for the data exchanges required to identify the cards 2140.

As a variant, the reader 2135 is replaced by a biometric identification device of known type, to identify the users accessing the content of the rack 2100.

The display 2145 is of known type, for example a Liquid Crystal Display (LCD screen) and used to display visible messages to users, for example instructions for their identification, for the positioning of products 2125 in the rack 2100 and to display warnings if the number of products of a given reference reaches a predetermined value or if one of the products is approaching its use-by-date.

Preferably, when the back wall supports an antenna, arrangements are made so that the electronic tags cannot be placed in the immediate vicinity of this antenna. For example, the back wall in front of each antenna is made slightly thicker, projecting into the rack.

Figure 22:
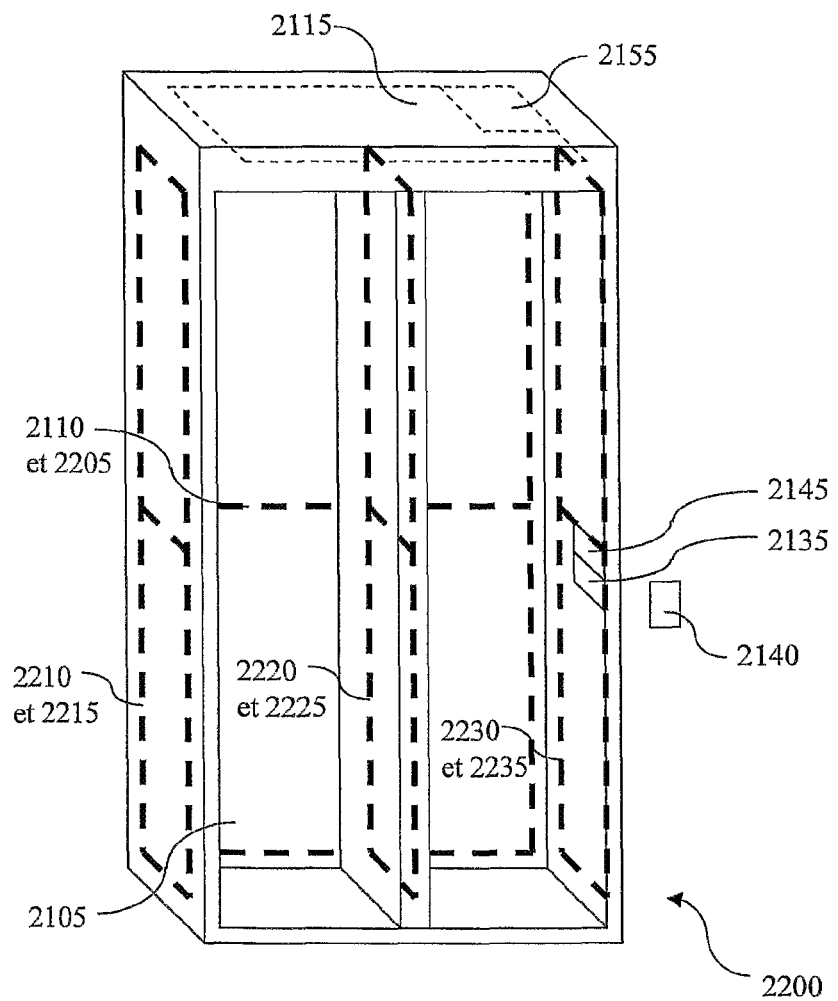
FIG. 22 is a diagrammatic representation of a second mode of realization of a rack according to this invention.

FIG. 22 shows, in a rack 2200, the same elements as in FIG. 21, the shelves and the products not being shown for clarity reasons, as well as an antenna 2205, in or on the back wall 2105 of the rack 2200, and antennae 2210, 2215, 2220, 2225, 2230 and 2235, placed two by two in or on the side walls 2240 and 2245 and central 2250 wall of the rack 2200. In this case, the electronic circuits 2115 are adapted to multiplex the uses of the antennae to successively query the electronic tags 2160 whose antennae are positioned according to orthogonal axes.

Figure 23:
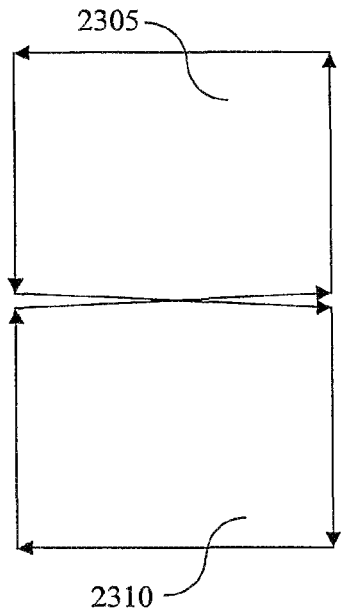
FIG. 23 is a diagrammatic representation of a first shape of antenna incorporated in a rack illustrated in FIG. 21 or 22.

FIG. 23 shows that a first shape of antenna 2300 incorporated in a rack illustrated in FIG. 21 or 22 consists of a figure-8, i.e. two coplanar loops 2305 and 2310, the conductor forming this antenna going alternately through one or the two loops, with opposite directions of rotation. In this figure, only one coil has been represented, it being understood that the antenna actually comprises a large number of superimposed coils.

Consequently, when the current flows through the two coplanar loops, in one of the loops it flows in the clockwise direction and, simultaneously, in the other loop it flows in the anticlockwise direction. This configuration generates an electromagnetic field over an extended volume near the back wall 2105 of the rack.

Figure 24:
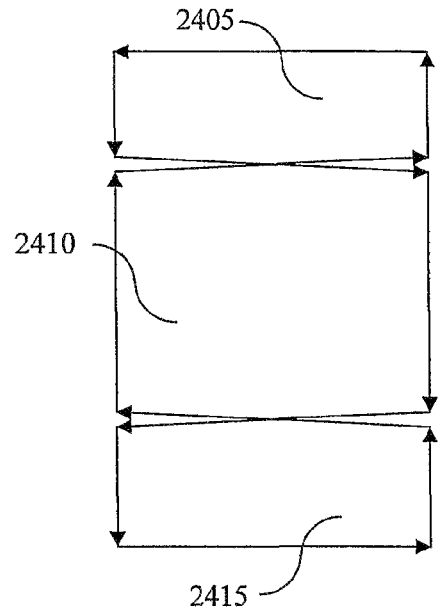
FIG. 24 is a diagrammatic representation of a second shape of antenna incorporated in a rack illustrated in FIG. 21 or 22.

FIG. 24 shows that a second shape of antenna 2400 incorporated in a rack illustrated in FIG. 21 or 22 consists of three coplanar loops 2405, 2410 and 2415, the conductor forming this antenna going alternately through the three loops, with directions of rotation alternately clockwise and anticlockwise. In this figure, only one coil has been represented, it being understood that the antenna actually comprises a large number of superimposed coils.

Consequently, when the current flows through the three coplanar loops, in at least one of the loops it flows in the clockwise direction and, simultaneously, in at least one other loop it flows in the anticlockwise direction. This configuration generates an electromagnetic field over an extended volume near the back wall 2105 of the rack.

Figure 25:
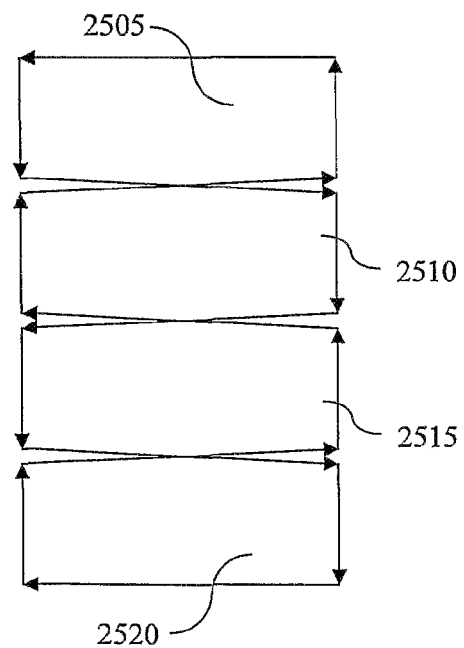
FIG. 25 is a diagrammatic representation of a third shape of antenna incorporated in a rack illustrated in FIG. 21 or 22.

FIG. 25 shows that a third shape of antenna 2500 incorporated in a rack illustrated in FIG. 21 or 22 consists of four coplanar loops 2505, 2510, 2515 and 2520, the conductor forming this antenna going alternately through the four loops, with directions of rotation alternately clockwise and anticlockwise. In this figure, only one coil has been represented, it being understood that the antenna actually comprises a large number of superimposed coils.

Consequently, when the current flows through the four coplanar loops, in two of these loops it flows in the clockwise direction and, simultaneously, in the other two loops it flows in the anticlockwise direction. This configuration generates an electromagnetic field over an extended volume near the back wall 2105 of the rack.

In the case of the rack illustrated in FIG. 22, for example, the back wall supports both an antenna as illustrated in FIG. 23 and an antenna as illustrated in FIG. 24 and each side or central wall supports an antenna as illustrated in FIG. 23. The inventors discovered, in fact, that this configuration covered the entire interior volume of the rack 2200 without leaving any dead areas, with the electromagnetic fields successively transmitted by the various antennae.

As a variant of the various modes of realization of the rack subject of this invention, at least one antenna is incorporated in a shelf. This antenna comprises at least two coplanar loops through at least one of which the current flows in the clockwise direction and, simultaneously, through at least one other loop the current flows in the anticlockwise direction, For example, this antenna is one of the antennae illustrated in FIGS. 23 to 25 or a combination of such antennae. The signal generation circuit 2115 is adapted to successively generate signals for various antennae related to various shelves.

Figure 26:
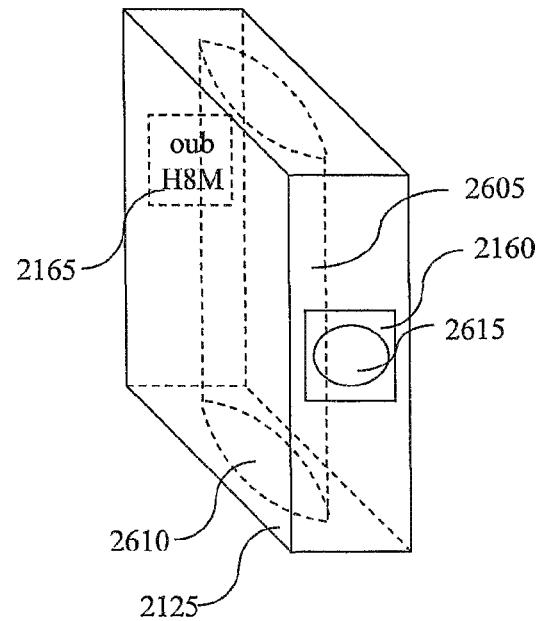
FIG. 26 represents a product especially adapted to be stored in a rack as illustrated in FIG. 21.

FIG. 26 shows a product 2125 comprising a paper label 2165 and the electronic tag 2160. The product comprises a metallic part 2610 (in this case a metallic or metal bag) which is thin, in other words of thickness less than one quarter of its largest dimension, on at least one of its edges 2605. The electronic tag 2160 has an antenna 2615 which is positioned substantially perpendicular to a thin edge of the metallic part 2610.

The antenna 2615 preferably has a width, measured in the direction of the thickness of the metallic part 2610, greater than the thickness of the edge 2605 of the metallic part opposite which the antenna is positioned.

The inventors have discovered that, with these characteristics, the electronic tag could be read despite the proximity of the metallic part and the electronic tag.

In FIG. 26, the product 2125 has the shape of a rectangular parallelepiped and comprises the electronic tag on one of its four smallest sides. The product 2125 also comprises a paper label 2165 positioned on a side of the product opposite the side of the product bearing said electronic tag. In this case, the paper label 2165 shows the reference "duo M8H".

As a variant, the paper label 2165 is positioned on one side of the product adjacent to a side of the product bearing said electronic tag 2160 on one of its small sides.

Consequently, when the user stores the product 2125, in a stack or vertically in the rack 2100 or 2200, he is encouraged to position it so that its paper label 2165 is visible. Due to this position, the electronic tag 2160 is positioned towards the back wall of the rack or towards one of its shelves, allowing the electronic tags 2165 to be read by an antenna positioned on or in the back wall or a shelf, respectively.

The inventors discovered, in fact, that with this configuration:
 the user could read the text shown on the paper label 2165, without moving the product 2125, and
 the electronic tags 2160 were positioned near to and opposite the antenna supported by the back wall 2105 of the rack or by a shelf in the rack.

When the product 2125 is flat, for example with a thickness of 10 mm to 12 mm, the electronic tag 2160 preferably comprises an elongated antenna 2615, for example measuring 8 mm×80 mm.

As show in FIG. 27, an initialization step 2702 is first carried out, during which associations are defined between:
 electronic tag identifiers and product references,
 electronic tag identifiers and product use-by-dates,
 minimum numbers of products of each reference below which products with this reference must be reordered and
 card identifications with user identifications.

Figure 29:
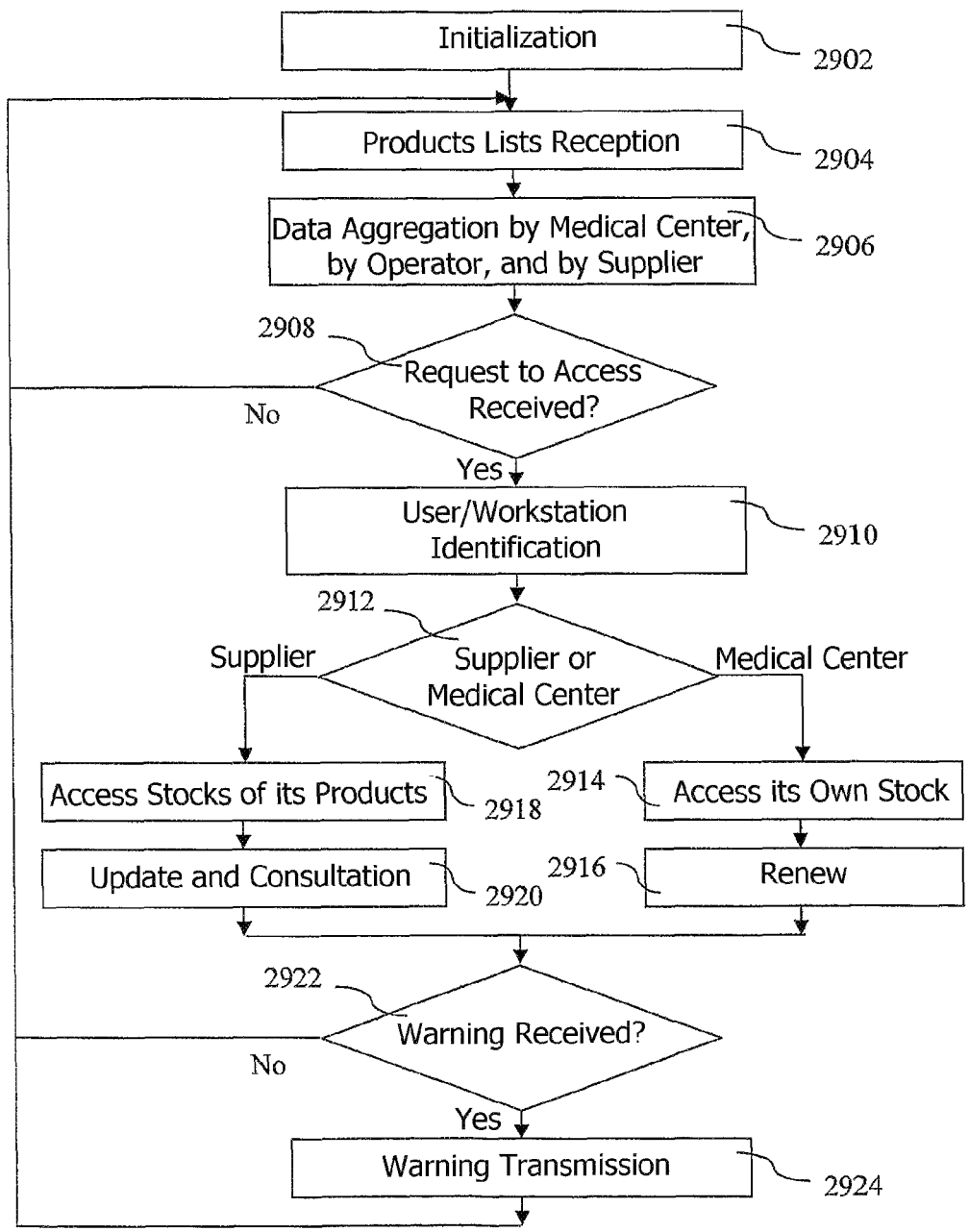
FIG. 29 represents a flowchart showing the operation of the computer system illustrated in FIG. 28.

This step 2702 can be carried out by reading data in a local and/or remote database, as indicated with reference to FIG. 29.

The rack circuits then perform a first read of the electronic tags present in the rack by successively generating magnetic fields on the various groups of antennae incorporated in the rack, step 2704, associating them with product references, step 2706, transmitting this information remotely, step 2708, and displaying, on the display, the rack use instructions.

When the user comes to open the rack he is identified, step 2710 and his identifier is stored, step 2712.

Whenever a user is identified, there is a predetermined timeout, for example two minutes, step 2714, then the electronic tags of the products present in the rack are read, step 2716, successively implementing the rack antennae.

At regular time intervals, for example every hour, intervals measured during a step 2722, the electronic tags of the products present in the rack are read, step 2724, successively implementing the rack antennae.

After each read, the identifiers of the electronic tags are associated with product references, step 2732, and this information is transmitted remotely, step 2734.

The list of products present is then compared with the list of products previously present, step 2736, and the user identification is associated with the references and identifiers of the products which have been added to or removed from the rack, step 2738, and this information is transmitted remotely, step 2740.

During a step 2742, a check is then carried out to determine, for one or more product references, whether the number of products present in the rack is less than or equal to a predetermined value. If yes, during a step 2744, a local warning is triggered, this information is transmitted remotely and the references of the missing products are shown on the display.

Then, if the result of step 2742 is negative or after step 2744, during a step 2746, a check is carried out to determine whether the use-by-date of at least one product present in the rack lies within a future of predetermined duration, for example one month. If yes, during a step 2748, a local warning is triggered, this information is transmitted remotely and the references of the products concerned are shown on the display.

Then, if the result of step 2746 is negative or after step 2748, the rack circuits display the rack use instructions on the display, before returning to step 2710.

Figure 28:
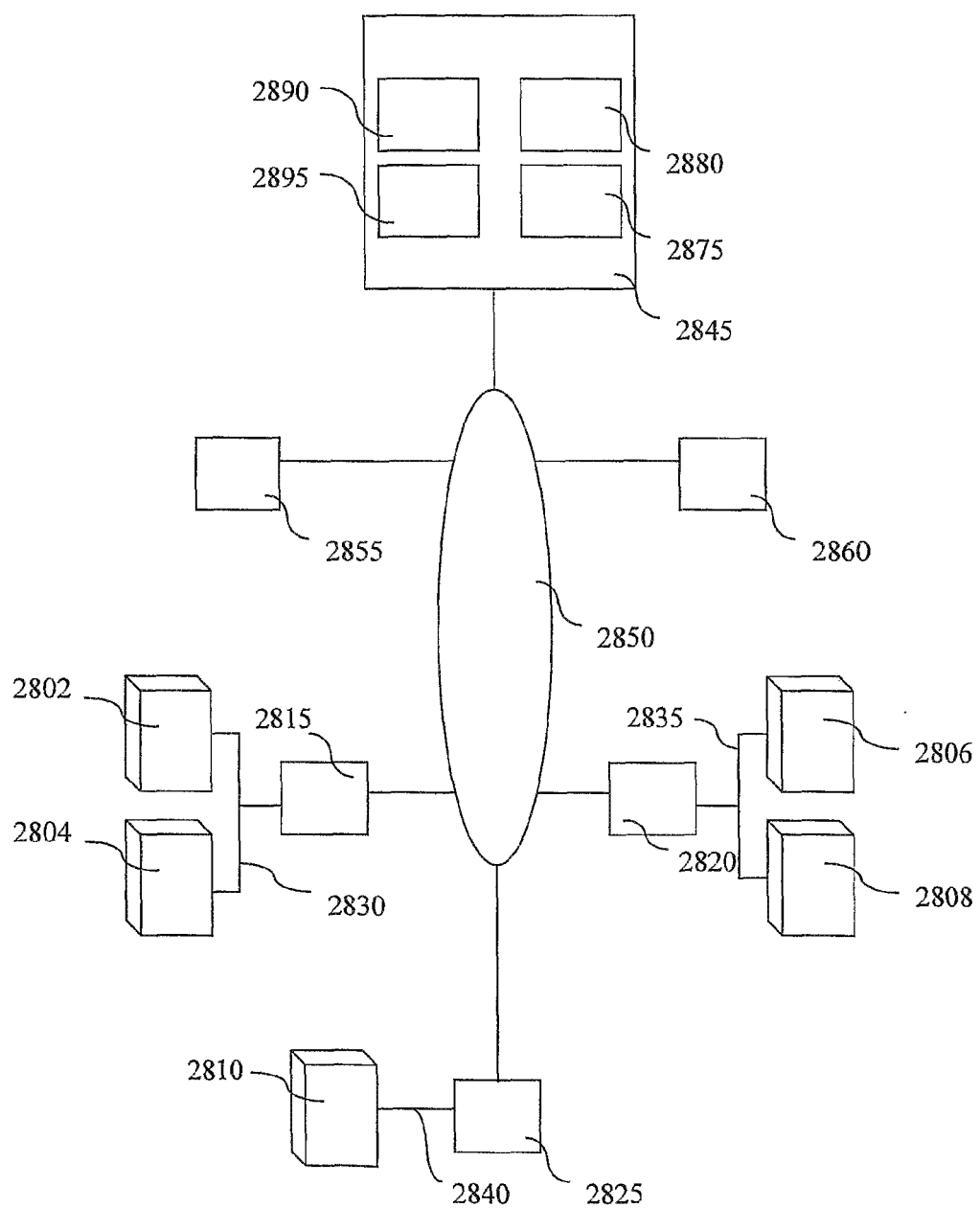
FIG. 28 represents a computer system according to this invention and comprising a plurality of racks as illustrated in FIG. 21 or 22.

FIG. 28 shows a computer system 2800 comprising a plurality of racks 2802 to 2810, as illustrated in FIG. 21 or 22 and connected together and to local workstations 2815, 2820 and 2825, by local networks respectively 2830, 2835 and 2840, a server 2845 connected to said local networks, by an external network 2850 and external workstations 2855 and 2860 connected, via the external network 2850, to the server 2845.

The workstations 2815, 2820, 2825, 2855 and 2860, as well as the server 2845 are of known type and each comprises a microprocessor and communication means, for example a modem, enabling them to communicate with the networks to which they are directly connected.

The local workstations implement several user interfaces to find and manage the stock of products available, reorder new stocks or manage the parameters triggering these reorders or access catalogues of products proposed by the various suppliers and place orders with them.

The external network 2850 is, for example, the Internet.

In addition, the server 2845 comprises a database 2875, means of selective access 2880 to the database by the workstations 2815, 2820, 2825, 2855 and 2860, a warning computer program 2890 and a monitoring computer program 2895.

The database 2875 contains information concerning the products contained in the racks 2802 to 2810.

The workstations 2855 and 2860 are implemented by suppliers of products likely to be stored in racks subject of this invention, preferably equipped with paper labels and electronic tags placed on opposite sides of these products.

The workstation 2815 and the racks 2802 and 2804 are located in a first product user centre and contain products from suppliers implementing the workstations 2855 and 2860.

The workstation 2820 and the racks 2806 and 2808 are located in a second product user centre and contain products from suppliers implementing the workstations 2855 and 2860.

The workstation 2825 and the rack 2810 are located in a third user centre and contain products from suppliers implementing the workstations 2855 and 2860.

The means of selective access 2880 to the database are of known type, for example authentication software (for example with user name and password or with card or biometric recognition) or signature software and are adapted to allow each product user centre to access to all its own stock of products contained in the racks 2802 to 2810, irrespective of the product suppliers.

The means of selective access 2880 are also adapted to allow each supplier to access, for all product user centers, the stock level, in the racks 2802 to 2810, of its own products.

The warning computer program 2890 is adapted to trigger warnings when a minimum number of products of a particular reference has been reached in the stock of a product user centre. This warning can be used to increase the number of products to be renewed to avoid further warnings.

The monitoring computer program 2895 is used to produce a sales report for each supplier, giving a summary of the references by product user centre and/or by territory.

Since each workstation of a product user centre can be connected by the Internet to the server 2845, it can be identified and receive information concerning the products in stock, i.e. entering a rack or leaving a rack in the product user centre concerned. Each workstation of a product user centre can also consult the delivery delays for the products stored in order to manage their renewal.

As shown on FIG. 29, an initialization step 2902 is carried out to initialize the various computer devices, during which the database of the product references and suppliers, and the means of authenticating the users and/or the various workstations likely to access the database, are created.

Then, during a step 2904, each rack supplies a first list of products it contains, this list being automatically renewed after each read of electronic tags in these racks and completed by warning and user identifications, as explained previously.

During a step 2906, the server aggregates the data received by product user centre, by supplier and by user.

During a step 2908, the server determines whether a request to access the database has been received. If not, return to step 2904. If the result of step 2908 is positive, during a step 2910, the user and/or the workstation attempting to access the database are identified.

If the identification fails, return to step 2904. If the identification succeeds, during a step 2912, a check is carried out to determine whether the user and/or the workstation attempting to access the database is a product user centre workstation or a supplier workstation.

If it is from a product user centre, access is allowed to all its own stock of products contained in the racks of this product user centre, irrespective of the product suppliers, step 2914.

It is also allowed, step 2916, to renew products with the suppliers, in which case the renewal request is sent to the suppliers concerned. During this step 2916, it is also allowed to select from catalogue and order products from the supplier, in which case the order is sent to the suppliers concerned. The product user centre therefore selects, in the database, the product references and quantities, the renewal or order forms being automatically distributed between the suppliers of the references concerned.

If, during step 2912, a supplier is found to be accessing, during a step 2918, this supplier is allowed to access, simultaneously for all the product user centers, the stock level, in said racks, of its own products.

The supplier is also allowed, step 2920, to update its catalogue, its product references, prices and delivery delays and to consult the renewal or order forms sent to it. The server can therefore be used to produce a sales report for each supplier, giving a summary of the references by product user centre and/or by territory, according to known techniques.

After step 2916 or 2920, a check is carried out to determine whether a warning has been received from a rack, step 2922, and, if yes, this warning is transferred to the workstation of the product user centre concerned, step 2924. Then, if the result of step 2922 is negative or after step 2924, return to step 2904.

As can be seen from the above, the invention is a significant improvement over the existing technique by providing an installation which can be used to manage simply and efficiently the stock in the product user centers and to manage the flow of equipment between the suppliers and these product user centers while allowing the suppliers to manage their stock stored in each product user centre.

FIGS. 30 to 38 concern more specifically the eleventh to fourteenth aspects of this invention.

Throughout the description, the communication protocol between a base station and an electronic tag is described, without describing:
- the elements used to manage the query requests allowing the base station to select the requests to be transmitted and each electronic tag to select the requests concerning it (for example, by following a tree of the possible electronic tag identifiers),
- the elements used to manage the replies from the electronic tags allowing them to decide when and how to reply to the requests from the base station and which allow the base station to manage the replies from the electronic tags (writing in databases, electronic tag temporary or permanent inhibition commands, triggering of alarms, etc.)

These elements are in fact well known by those skilled in the art of electronic tags, especially RFID, and are described in numerous published patents.

Figure 30:
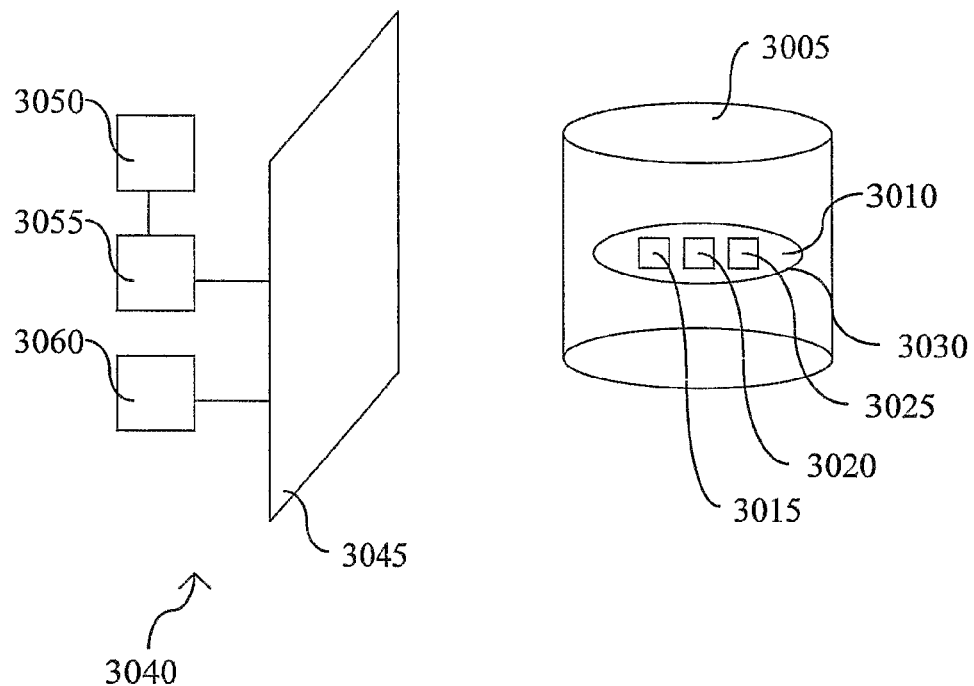
FIG. 30 is a diagrammatic representation of an example of implementation of this invention in a radio frequency electronic tag reading system.

FIG. 30 shows an object 3005 associated with an electronic tag 3010 which comprises:
- an antenna 3030,
- a reception means to receive signals modulated at a first frequency 3015,
- a processing means 3020 to process the signals received by the reception means to identify a query signal to which said electronic tag must reply and
- a transmission means to transmit signals modulated at a second frequency different from said first frequency 3025.

FIG. 30 also shows a base station 3040 to query electronic tags 3010, which comprises:
- at least one antenna 3045,
- a transmission means to transmit signals modulated at a first frequency 3060.
- a reception means to receive signals modulated at a second frequency different from said first frequency 3055 and
- a processing means to process said signals modulated at the second frequency 3050 to identify a response signal transmitted by said electronic tag 3010.

The object 3005 can be of any type. It is assumed here that it comprises metallic parts which affect the magnetic field surrounding the electronic tag 3010. The antenna 3030 is of known type. It is for example circular and equipped with numerous turns to increase its sensitivity to the magnetic fields generated by the antenna 3045. The reception means 3015 and the transmission means 3025 implement the antenna 3030 to communicate with the base station 3040. The transmission means is described with reference to FIGS. 34 to 36.

FIG. 30 shows only one antenna 3045. However, in numerous modes of realization of this invention, a set of antennae oriented differently or with different geometries is implemented so that any electronic tag present within a predetermined volume can be identified, irrespective of its position or orientation in this volume.

Figure 31:
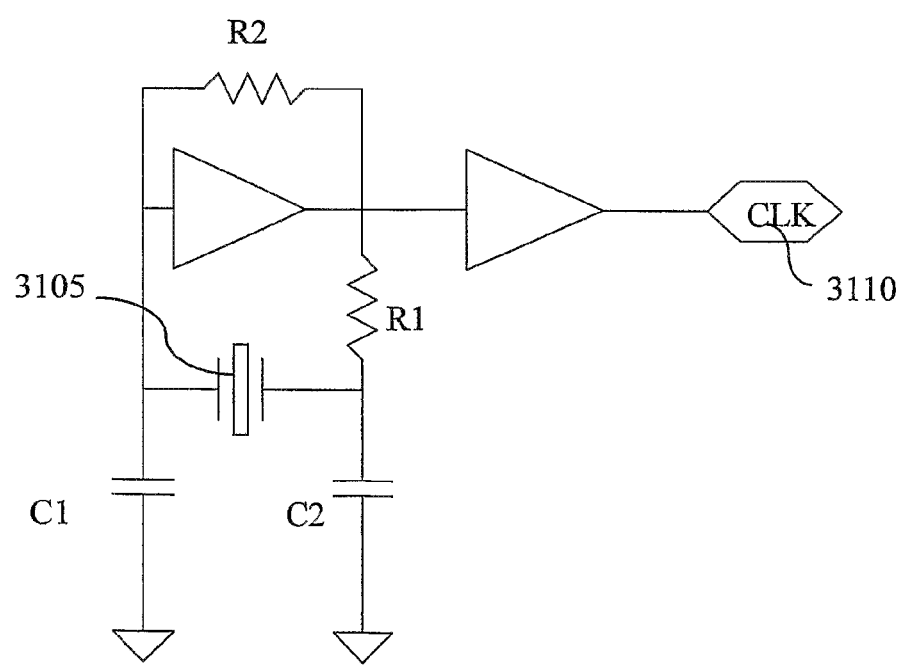
FIG. 31 represents a clock generation circuit integrated in a base station.
Figure 32A:
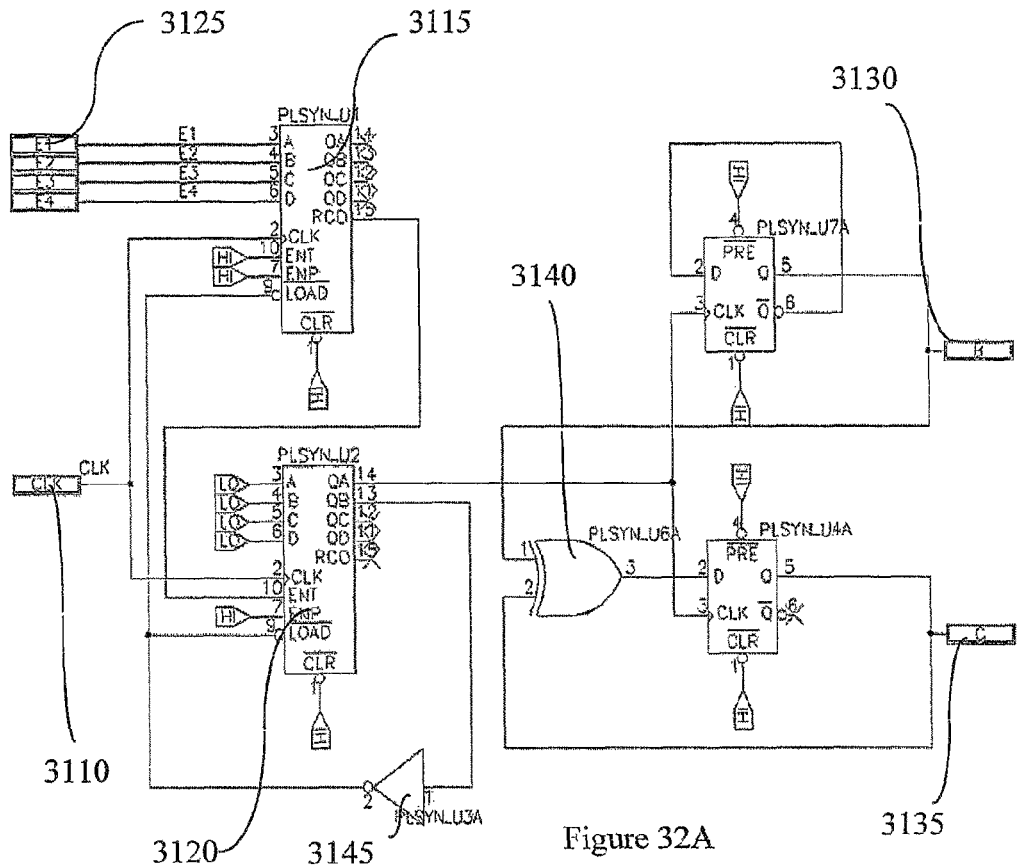
FIGS. 32A and 32B represent a logic circuit integrated in a base station.
Figure 32B:
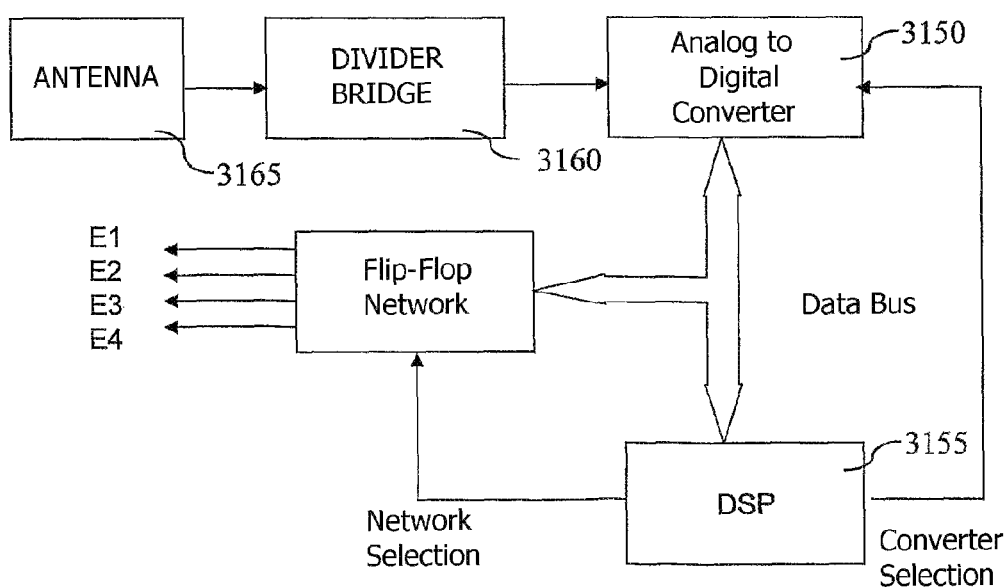

The transmission means 3060 is partially illustrated in FIGS. 31, 32A and 32B.

By implementing a non-resonating tag, although the sensitivity of the tag is affected, its electrical characteristics are relatively unchanged, compared with the same tag used in resonance.

Preferably, the first frequency is less than 200 kHz and the second frequency is equal to half the first frequency. Implementing a first low frequency results in better penetration of the magnetic field in the metallic parts of the object 3005. In addition, by choosing to reply at a second frequency half of the first frequency, this frequency is more easily detected on the antenna of the base station 3045. In addition, automatic tuning may guarantee that a maximum amount of energy will be available to power the electronic tag 3010.

As can be seen with reference to the electronic diagrams in FIGS. 31, 32A and 32B, the base station electronics provide automatic tuning in order to receive the maximum magnetic field according to the metallic mass and its position in front of the antenna. To do this, the read frequency is varied by controlling the amplitude of the voltage on the antenna in order to check constantly that $LC\omega^2=1$.

Using a quartz 3105, oscillating for example at 14.13838 MHz, a clock is generated at this frequency (FIG. 31) on the output CLK 3110, with a traditional electronic circuit.

Then, using the logic circuit illustrated in FIGS. 32A and 32B, the second working frequency and its double corresponding to the first frequency are created according to the position of the four pre-positionable binary inputs 3125 of a programmable counter 3115 (inputs E1, E2, E3 and E4). The values of the inputs E1, E2, E3 and E4 are selected to maximize the voltage V (see FIG. 37).

N being a number chosen on the four inputs of the counter 3115 and

F being the frequency of the quartz 3105, thus:

$$F0\min = \frac{F}{4(33-N)}$$
$$= \frac{14.31818}{4(33-0)}$$
$$= 108.471 \text{ kHz}$$

and $$F0\max = \frac{F}{4(33-N)}$$
$$= \frac{14.31818}{4(33-15)}$$
$$= 198.863 \text{ kHz}$$

F0min is the minimum value of the first frequency and F0max is the maximum value of the first frequency.

The first frequency can therefore be positioned from 108.470 Hz to 198.863 Hz in variable steps of average value 3.389 Hz. According to the frequency variation and the required resolution, the quartz can be changed (for example with a 10 MHz quartz, the first frequency can be positioned from 75.757 Hz to 138.888 Hz in variable steps of average value 2.367 Hz.)

FIG. 32A shows the wiring of the counters 3115 and 3120. At the output of the counter 3120, the frequency is four times the first frequency. Component 3140 is an "XOR" gate and component 3145 is an inverter. The output 3130 "B" of a flip-flop "D" is twice the first frequency, for example 125 kHz, the latter being on the signal present at output 3135 "C" of a second flip-flop "D". By using the circuit shown in FIG. 32A, we obtain the first frequency at output 3135. The output 3130 supplies the double frequency, which is only used as a synchronization signal in the base station.

The components 3115 and 3120 are used to divide a frequency from a quartz according to the formula described (preloadable reversible counter). The minimum frequency (F0min) and the maximum frequency (F0max) can be adjusted by changing the quartz.

The base station is equipped with a slaving means to slave the frequency Fr of the signal transmitted by the antenna 3045 so that this frequency Fr respects the equation $L \times C \times (2 \times pi \times Fr)^2 = 1$, equation in which L is the inductance of the transmission circuit comprising the antenna and C is the capacitance of the transmission circuit comprising the antenna.

To provide the slaving, an analogue to digital converter 3150 is used to download to a digital signal processor (DSP) 3155 the peak value present on the transmission antenna. This value is taken after a divider bridge 3160 of high impedance adapted to keep the level of the setpoint between 0 V and 10 V and not disturb the tuning of the antenna 3165. This value is compared, by the digital signal processor 3155, with the voltage setpoint acquired in the absence of a metal bottle then the digital signal processor 3155 varies the frequency Fr to reach the level of the setpoint by changing the four inputs of the counter 3115.

Figure 33:
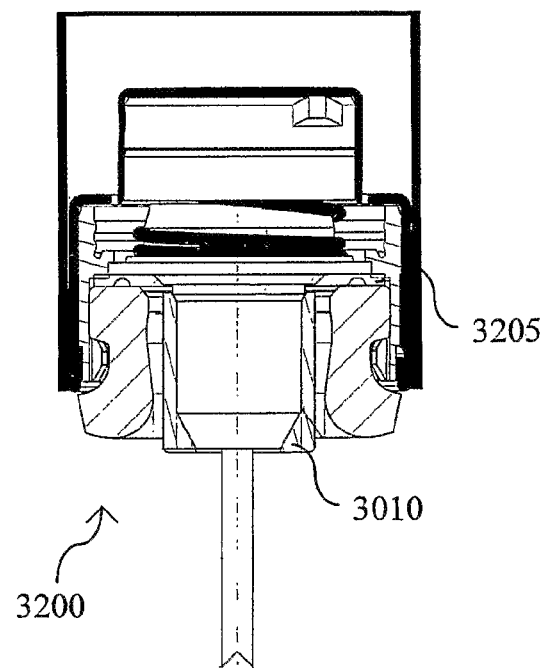
FIG. 33 represents, in cross-section, the integration of an electronic tag in a perfume bottle pump comprising metallic parts.

If an electronic tag 3010 is associated with a pump 3200 for perfume bottle, as illustrated in FIG. 33, the RFID electronic tag 3010 is positioned at the centre of the pump structure, surrounded by the metallic parts 3205 of the pump, which are represented by dark areas in FIG. 33.

The tag response principle consists in modulating the response signal at a second frequency less than the first frequency and equal in this case to half the first frequency.

This second frequency, equal to half the first frequency, is preferred since this frequency carries the most energy and can easily be produced by the electronic tag 3010.

To do this, the transmission means 3025 of the electronic tag 3010 modulates, or "loads" one alternation out of two of the carrier (first frequency) to obtain a signal of half the frequency. Since the clock is preserved, the electronic tag only cuts 80% of the signal.

Figure 34:
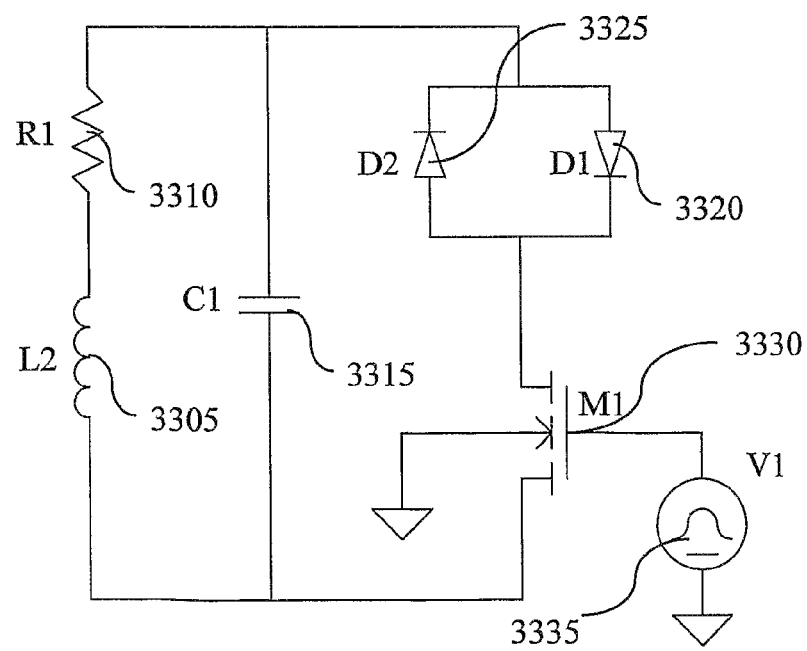
FIG. 34 represents an electronic tag electronic circuit according to this invention.

FIG. 34 shows the assembly used to modulate the tag antenna formed by the inductor L2 3305, a series resistor R1 3310 of the antenna 3030 and a spurious capacitor C1 3315 of the antenna 3030, and two diodes D1 3320 and D2 3325 guaranteeing at least a minimum signal at the first frequency F0 on the antenna of the electronic tag 3010. The modulation transistor M1 3330 operates as a switch and the control voltage V1 3335 is, in time, as represented in FIG. 35, with a frequency equal to the second frequency, i.e. 62.5 kHz.

Figure 35:
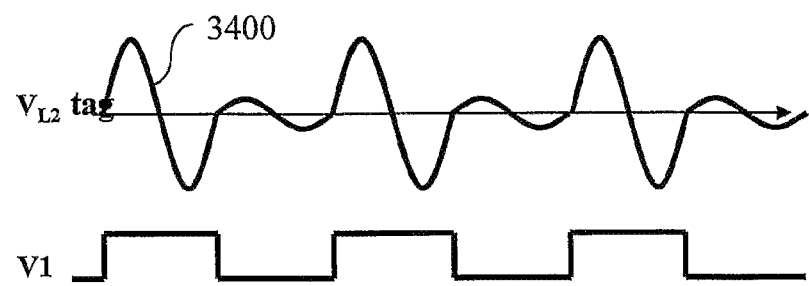
FIG. 35 represents the shape of a signal leaving the circuit illustrated in FIG. 34.

The signal $V_L2$ 3400 represented in FIG. 35 shows the charge of the voltage $V_L2$ when V1 is 1.

Figure 36:
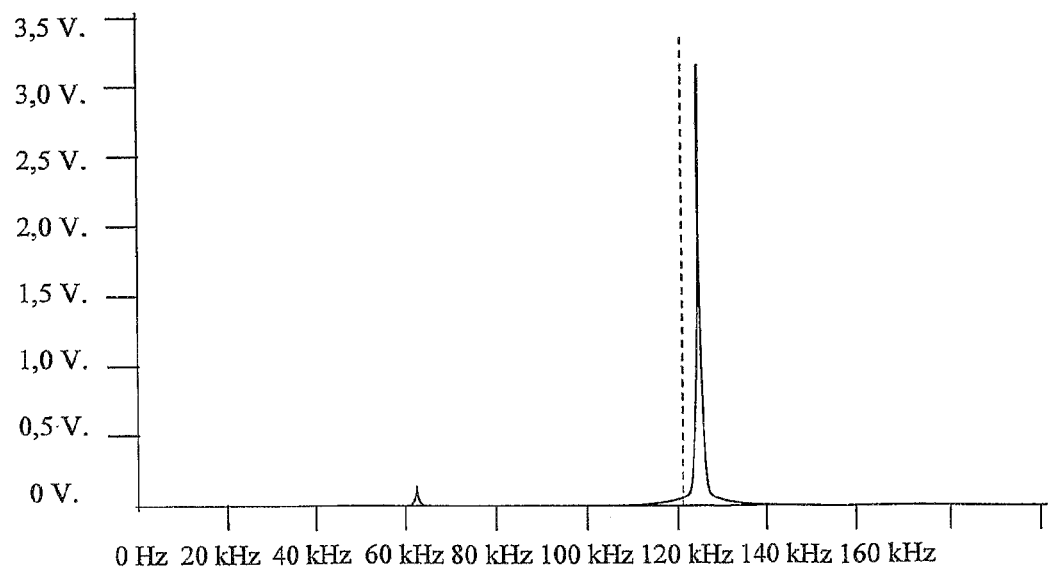
FIG. 36 represents a signal spectrum present on the electronic tag when it replies to a query signal.

FIG. 36 shows the spectrum of the signal present on the electronic tag 3010 when it replies: a line of smaller density is present at the second frequency. This second frequency is detected by the reception means 3055, via the antenna 3045 of the base station 3040.

Note that an antenna behaves as an RLC circuit comprising an inductor in series with a resistor, the inductor and the resistor being in parallel with a capacitor. The resonance frequency is such that $L \times C \times (2 \times pi \times Fr)^2 = 1$. The antenna gain varies according to the frequency transmitted starting from value 1 for zero frequency, increasing up to the resonance frequency Fr then decreasing afterwards. For example, this gain reaches a value of 30 for the resonance frequency Fr.

To adjust the resonance frequency to the required transmission frequency, a capacitor is added in parallel with the antenna.

Figure 37:
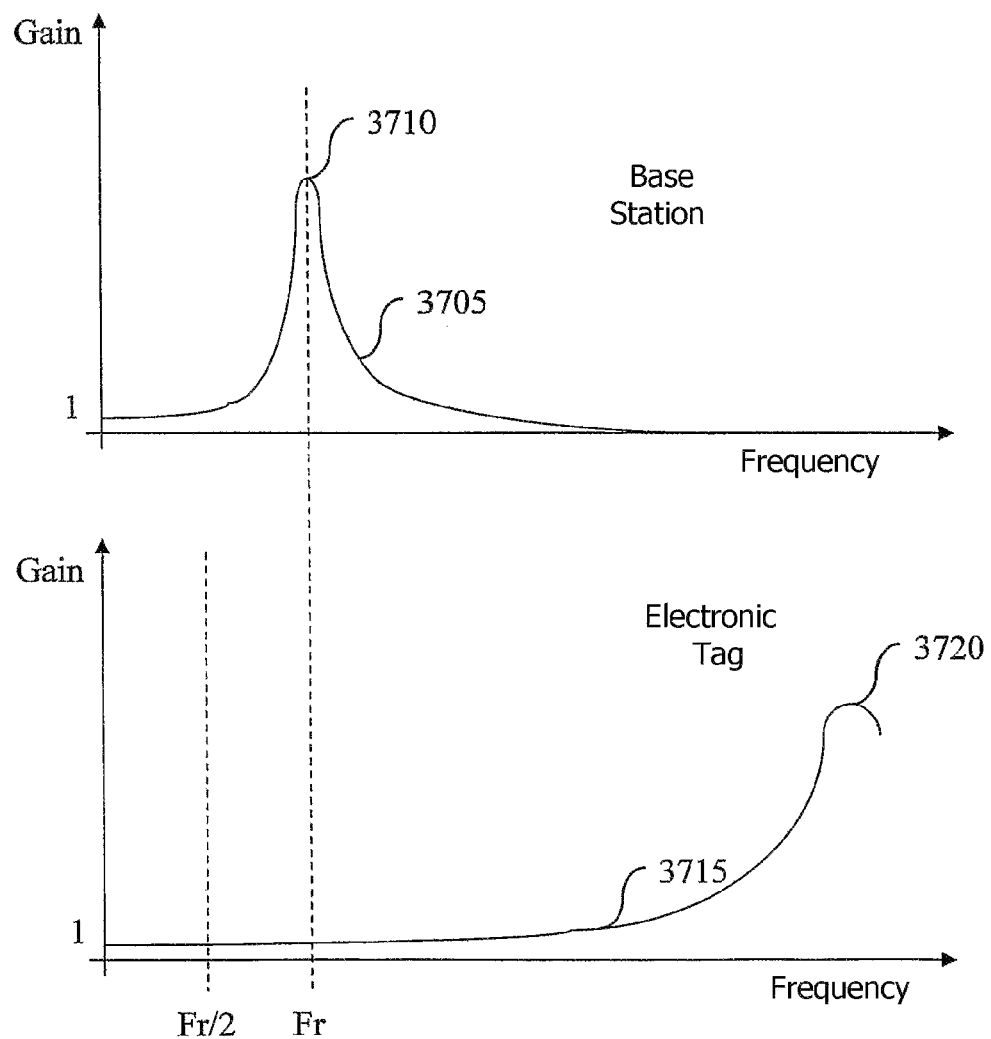
FIG. 37 is a diagrammatic representation of the frequencies preferably implemented by antennas of the device illustrated in FIGS. 30 to 36.

FIG. 37 shows, at the top, the curve 3705 of gain against the frequency of the signal supplied to the base station antenna.

According to an aspect of this invention, the power supply circuit of the base station antenna is adapted to compensate for the inductance variations due to the presence of metal or of electronic tag antennae within the antenna transmission field by modifying the transmission frequency in order to maintain the relation $L \times C \times (2 \times pi \times Fr)^2 = 1$. The gain of the transmission antenna therefore remains substantially constant irrespective of the disturbances encountered.

The antenna therefore always transmits a signal at the resonance frequency, indicated by the vertical broken line and the reference 3710.

According to another aspect of this invention, the resonance frequency of the electronic tag antenna is shifted with respect to the frequency of the signal transmitted by the base station. Preferably, the resonance frequency of the electronic tag antenna is greater than the frequency of the signal transmitted by the base station. Preferably, the resonance frequency of the electronic tag antenna is equal to at least double the frequency of the signal transmitted by the base station. FIG. 37 shows, at the bottom, the curve 3715 of the gain of the electronic tag antenna against the frequency of the signal received. We see that the resonance frequency indicated by the reference 3720 is more than twice the frequency received, corresponding to the reference 3710.

For example, for signals transmitted by the base station of frequency between 125 kHz and 225 kHz, the resonance frequency of the electronic tag antennae is between 400 kHz and 700 kHz.

Thanks to these characteristics, the gain of the electronic tag antenna is close to 1 at the frequency transmitted by the base station antenna and, consequently, at the electronic tag response frequency which is, for example, half the frequency of the signal transmitted by the base station, as described with reference to FIGS. 30 to 36.

Figure 38:
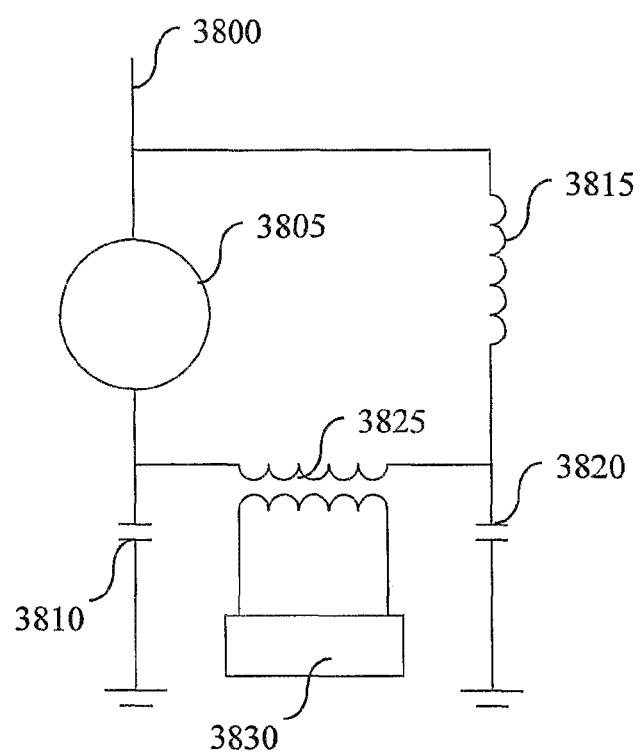
FIG. 38 is a diagrammatic representation of a special mode of realization of an electronic reception circuit of a base station of the device illustrated in FIGS. 30 to 37.

FIG. 38 shows an electronic diagram of a base station reception circuit in which the transmission signal enters the circuit via the input 3800 and crosses the antenna 3805 in series with a capacitor 3810. In parallel with this branch of the circuit formed by the antenna 3805 and the capacitor 3810, an image bridge is used to supply the same intermediate voltage as the voltage present between the antenna 3805 and the capacitor 3810. The image bridge comprises an inductor 3815 and a capacitor 3820. The values of the inductor 3815 and of the capacitor 3820 are adapted so that the current flowing through this image bridge is much lower, for example ten times lower, than the current flowing through the antenna 3805.

The primary circuit of a transformer 3825 is connected firstly between the antenna 3805 and he capacitor 3810 and secondly between the inductor 3815 and the capacitor 3820. The secondary circuit of the transformer 3825 is connected to a filtering and amplification circuit 3830 whose output is connected to the base station processing circuits which process the signal from the electronic tags.

Thanks to the image bridge, since the signals received, which have the electronic tag transmission frequency, in this case half the base station transmission frequency, are only present between the antenna 3805 and the capacitor 3810, they can be detected by the filtering and amplification circuit 3830. However, the signals having the base station transmission frequency which, as we have seen above, can be variable, do not modify the equality of the voltages across the terminals of the primary circuit of the transformer 3825 and therefore do not disturb detection of the signals received from the electronic tags.

Figure 39:
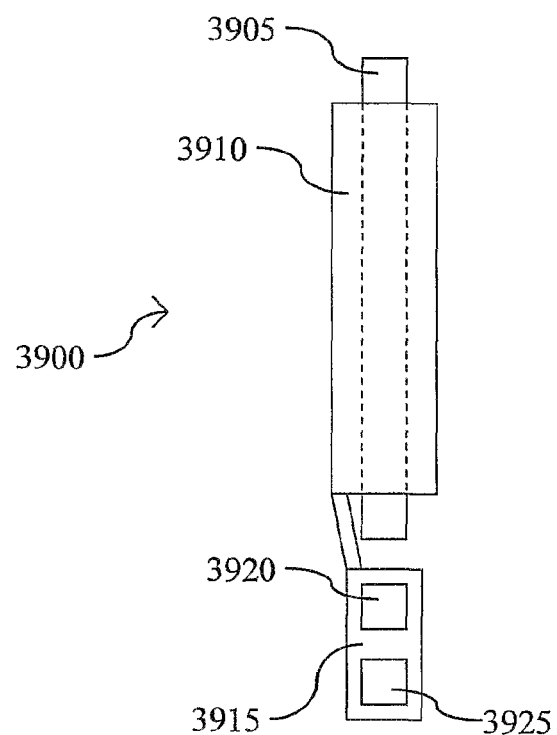
FIG. 39 is a diagrammatic representation, in plan view, of a special mode of realization of an electronic tag subject of this invention.

FIGS. 39 to 43 concern more specifically the fifteenth to seventeenth aspects of this invention. FIG. 39 shows a passive electronic tag 3900 comprising:
- a core 3905 of electrically-insulating material of relative magnetic permeability above fifty,
- a coil 3910 surrounding the core 3905, coil 3910 forming an antenna adapted to receive a query signal from a base station (see FIG. 42),
- an electronic circuit 3915 comprising a memory 3920 storing an identification code and processing means 3925 adapted to process the query signal from the base station to determine whether the electronic tag 3900 must reply and, if yes, to command transmission of a signal by the antenna 3910.

The core 3905 is, for example, cylindrical with circular base. Preferably, the core 3905 consists of and comprises a ferrite. Consequently, in the remainder of the description, the insulating material of high magnetic permeability forming the core will be called "ferrite", without this being limiting.

The conducting wire forming the coil 3910 is, for example, thermoadherent.

The sensitivity of the antenna 3910 is therefore multiplied according to the relative magnetic permeability of the material forming the core, a value which may exceed 250, or even 650, for a ferrite core, compared with the same antenna without ferrite core.

Note that the sensitivity of a traditional RFID tag formed from a coil of N turns of conducting wire, coiled on an average area S, is given by the traditional relation:

$$B_{min} = \frac{V_{p.supply}}{\omega NS} \quad (1)$$
$$\cong \frac{3}{\omega NS}$$

where $\omega = 2\pi f$
f being the base station working frequency.

According to this invention, the sensitivity of the antenna 3910 of the electronic tag 3900, of miniature dimensions to save space on products of small dimensions (see FIGS. 41A and 41B) is increased by winding the antenna 3910 on a core 3905, also known as a rod, of electrically-insulating material of relative magnetic permeability above fifty, preferably a ferrite. The magnetic permeability p of this type of material is much higher than that of non ferromagnetic metals since this permeability consists of two terms:

$$\mu = \mu_0 \mu_r \quad (2)$$

Where $\mu_0$ is the magnetic permeability in vacuum $4\pi 10^{-7}$ and where $\mu_r$ is the relative magnetic permeability of the material which takes values of up to several hundred (typically 250 or 550).

A ferrite also exhibits the characteristics of an electrically-insulating medium since the electrical conductivity of a ferrite is equal to zero.

The magnetic field lines are therefore focused in the ferrite core, as though the area of the ferrite core was multiplied by the relative magnetic permeability $\mu_r$. The magnetic field is therefore guided by the ferrite core.

The base station antenna or inductor (see FIG. 42) can be defined by the radius $R_1$ of its assumed circular antenna and by the number of turns $N_1$ of the base station antenna.

In the presence of ferrite surrounded by a coil of radius $R_2$ with a number of turns $N_2$, placed at a distance D from the base station antenna, the mutual coupling inductance $M_{21}$ or $M_{12}$ between the two antennae is given by the following relation:

$$M_{12} = \frac{\mu_0 \mu_r \pi R_1^2 R_2^2 N_1 N_2}{(D^2 + R_1^2)^{\frac{3}{2}}}$$

The mutual coupling inductance between the two coils is therefore, due to the presence of the core 3905, multiplied by the relative magnetic permeability $\mu_r$.

The area of an antenna depends on the tag's geometric parameters:

$$S = \frac{\pi}{12}\left(3D^2 - 3D\frac{N}{b}\Phi^2 + \frac{N^2}{b^2}\Phi^4\right)$$

where N: number of turns
b: coil thickness
Φ: diameter of the wire used to make the coil The inductance of a coil without a core is given by the following relation to within ±5%:

$$L = \mu_0 \pi \frac{a^2 N^2}{b + c + R} F' F''$$
$$F' = \frac{10b + 12c + 2R}{10b + 10c + 1.4R}$$
$$F'' = 0.5\log\left(100 + \frac{14R}{2b + 3c}\right)$$

where R is the outer radius of the coil.
b its thickness.
a the average radius.
c is the inner radius.

For a long coil, F' and F'' are approximately equal to 1.

When the antenna is formed from a coil on a core of insulating material of relative magnetic permeability $\mu_r$, of diameter $D_1$ and length $L_2$, n turns are wound over a length $L_1$. The outer diameter of the turns is called $D_2$.
The coil area is A.
We can therefore write:

$$A = \pi \frac{D_2^2}{4}$$
$$R_m = \frac{L_1}{\mu A}$$
$$L = \frac{n^2}{R_m}$$
$$= \frac{n^2 \mu A}{L_1}$$

In the mode of realization tested by the inventors, the wire used is thermoadherent, type 51/62 μm (copper diameter 51 μm, sheathed diameter 62 μm) or 20/25 μm.

The number of turns is the product of the number of turns per layer by the number of layers. For a wire of sheath diameter d, the number of layers of wire is equal to $L_1/d$.
The number of turns per layer is equal to $(D_2-D_1)/(2d)$.

In practice, the parameters are all related to each other and are not independent. The reluctance Rm and the magnetic permeability p are therefore difficult to measure.

For a highly permeable core 3905 of length $L_2$ plunged into a magnetic field, the field lines will go through this core 3905 if the path in air is equal to the length of the core 3905. All field lines whose distance from the axis of the core 3905 is less than $L_2/2$ will go through the core 3905.

This can also be expressed by "the equivalent area of a ferrite antenna of diameter D and length L is equivalent at best to L/D times the sensitivity of a tag of diameter D."

The true magnetic permeability p is highly dependent on the ratio between the length of the core 3905, the diameter of the core 3905 and the relative magnetic permeability $\mu_r$ of the core 3905. The value of $\mu_r$ provided by the manufacturer of the core, for example of the ferrite, is the asymptotic value $\mu_{asymptotic}$ for a very long ferrite whose length tends to infinity.

In practice, an effective magnetic permeability $\mu_{effective}$ of the core 3905 can be calculated after defining the length of the core 3905, its diameter and the permeability corresponding to the asymptotic value $\mu_{asymptotic}$.

Figure 40:
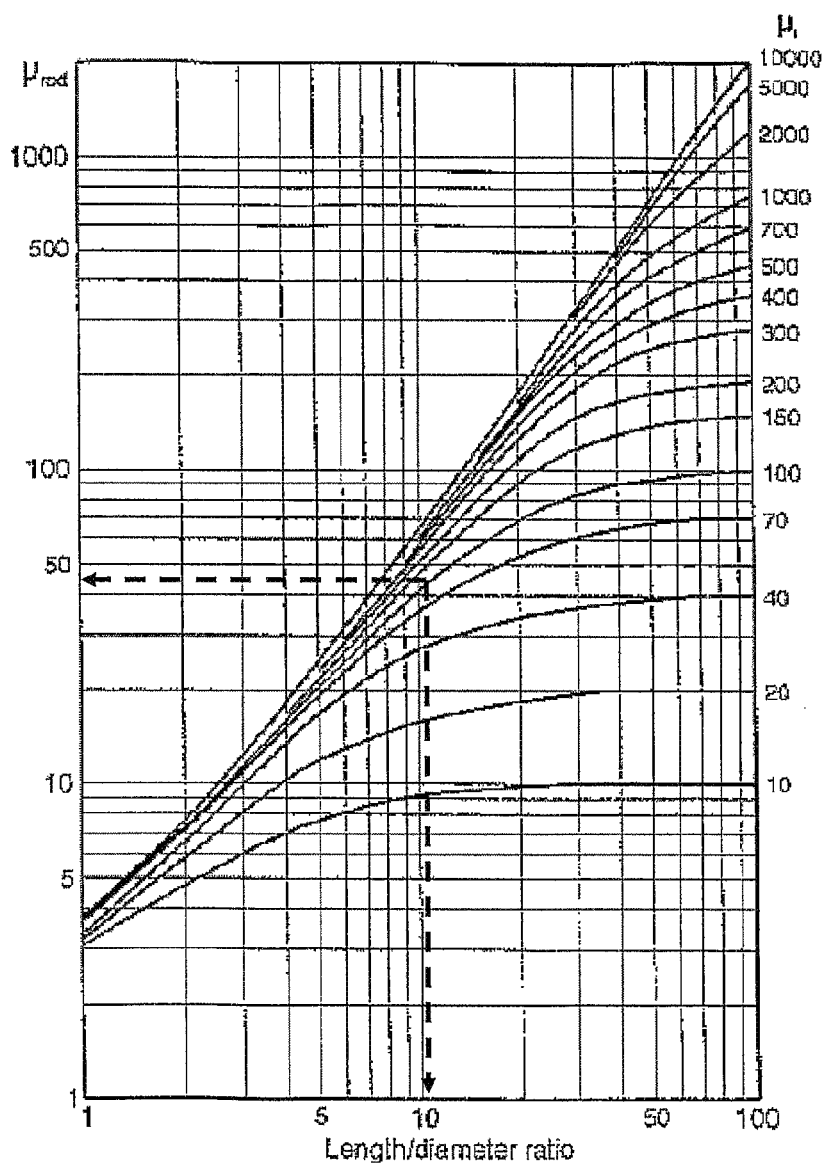
FIG. 40 represents a group of curves used to determine a true magnetic permeability according to a length/diameter ratio of a ferrite and according to an asymptotic magnetic permeability.

The network of curves illustrated in FIG. 40 can be used to quickly estimate the effective value of $\mu_r$, knowing I and d. The example marked by perpendicular arrows shows the transfer from asymptotic ferromagnetic permeability $\mu_{asymptotic}$ to effective magnetic permeability $\mu_{effective}$ with a ratio I/d=10.

The effective magnetic permeability $\mu_{effective}$ can also be calculated by measuring the inductance of a coil wound on ferrite core and measuring or calculating the inductance of an identical coil without ferrite core. The ratio gives the value of the magnetic permeability p directly.

For example, for a long coil with and without ferrite with the following characteristics:
Length b of the coil=7 mm.
Outer diameter of the turns=1.7 mm, radius R=0.85 mm.
Inner diameter=1 mm.
Diameter of wire used=22 μm.
Number of turns in the coil=1800.

To calculate the inductance in air, we determine that the inner diameter is equal to the difference a−c/2, where c is equal to the difference between the outer radius and the inner radius.
Consequently, c=175 μm
And a=325 μm.
The number of layers of copper wire is 6, the number of layers is 300. These figures are compatible with a number of turns equal to 1800.

The inductance of the coil without core is approximately 172 pH.

The inventors have measured an inductance of the coil with ferrite core and found a value of 16 mH.

We can therefore estimate that, for this coil wound on a ferrite of length 8 mm, the effective magnetic permeability $\mu_{effective}$ is approximately 93. The magnetic permeability $\mu_{asymptote}$ given by the manufacturer is approximately 650.

The sensitivity of an electronic tag without core can be evaluated at approximately 3.6 mT. In practice, we have observed a value close to 500 μT. The gain of the antenna equipped with a ferrite core is therefore very close to 7, which confirms the advantage of implementing this invention.

We observe that the weight of an antenna made on ferrite may, in the current situation of commercial offers, drop down to 35 milligrams.

Figure 41A:
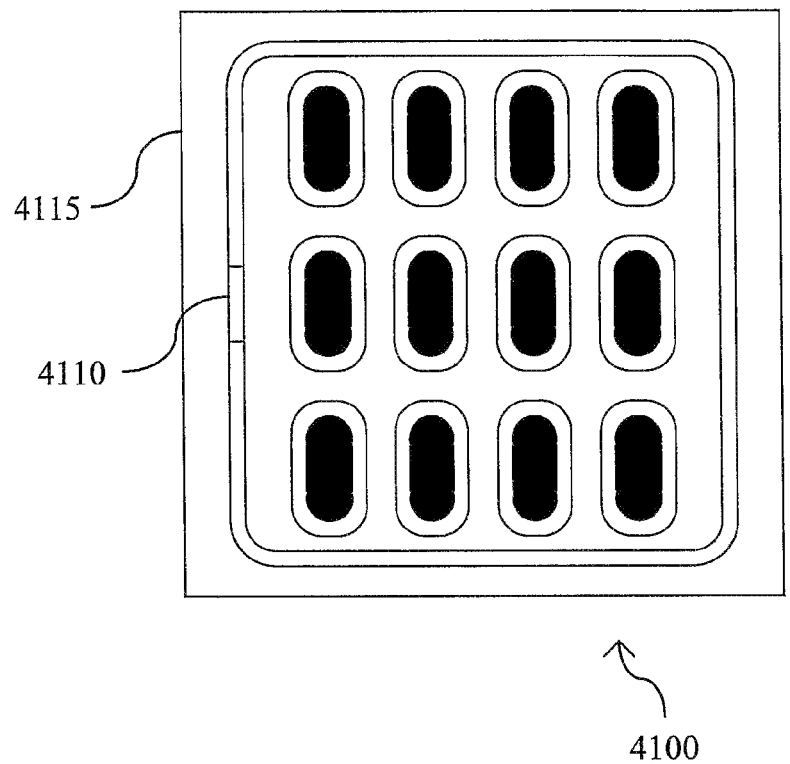
FIGS. 41A and 41B are diagrammatic representations, in plan view and in side view, of a special mode of realization of a product according to this invention.
Figure 41B:
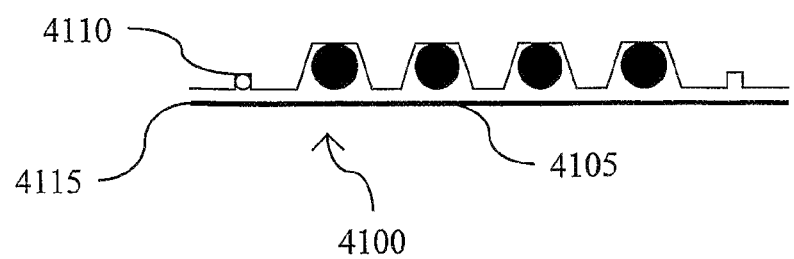

FIGS. 41A and 41B show a product 4100 comprising a metallic part 4105 and an electronic tag 4110.

When an electronic tag is to be associated with a metallic part, for example the metallic film of a blister, the film, placed perpendicular to the transmitting antenna of a base station disturbs the tuning of this transmitting antenna and behaves like a loss generator weakening the electric current powering the electronic tag. An electronic tag placed flat on a blister can be read at a short distance, but it would be quite unrealistic to attempt to read a stack of blisters marked in this way.

According to an aspect of this invention, the electronic tag 4110 is similar to the electronic tag 3900 detailed with reference to FIG. 39. Preferably, the antenna of the electronic tag 4110 is positioned near and parallel to one edge 4115 of the metallic part 4105.

In the mode of realization described and represented, the metallic part 4105 is a metallic blister film comprising, apart from a film of insulating material, generally, a plastic thermoformed material, the metallic film and the film of insulating material enclosing a content, for example medications. The product 4100 then consists of this blister and, possibly, of its non-metallic packaging, made for example of card or plastic.

The blisters are, roughly speaking, equivalent to a metallic plate with, all around the blister, a groove formed in a film made from insulating material, generally, a plastic thermoformed material. The groove is therefore, all around the product, parallel and near to one edge of the metallic part formed from the metallic film.

Preferably, the antenna of the electronic tag is positioned in this groove.

Thanks to the implementation of this invention, the electronic tag 4110 can be read despite the presence of metallic parts, even when several similar products are stacked.

The sixteenth aspect of this invention consists in implementing an electronic tag comprising an antenna of very small dimensions made by forming a coil on a core of insulating material of high relative magnetic permeability, for example a ferrite and, preferably, in positioning said antenna parallel and near to one edge of the metallic part.

The electronic tag placed in the groove around the blister can be used to mark all types of blister irrespective of their content. The electronic tag can be easily and automatically deposited in the blister at the same time as the contents, for example tablets or capsules, stored in the blister.

Figure 42:
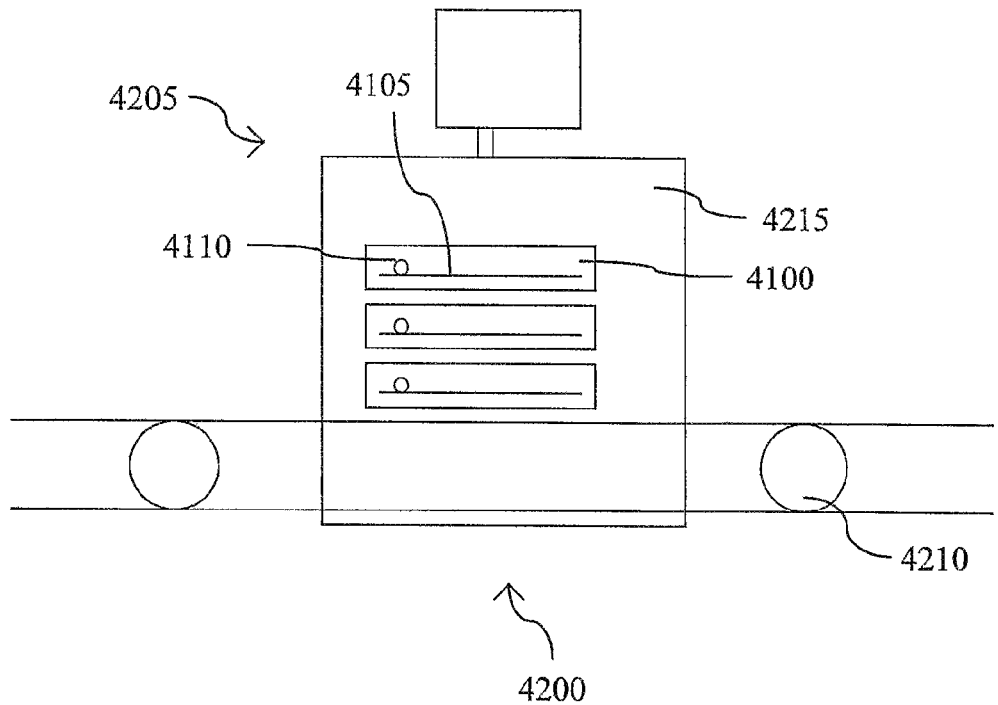
FIG. 42 is a diagrammatic representation of a special mode of realization of an identification device subject of this invention and FIG. 43 represents, as a logic diagram, steps implemented in a special mode of realization of the method subject of this invention.

FIG. 42 shows an identification device 4200 to identify at least one product 4100, which comprises a base station 4205 and a presentation means 4210 to present products 4100. The base station 4205 comprises a transmitting antenna 4215 with a main plane. For example, the transmitting antenna 4215 is flat.

According to an aspect of this invention, the main plane of the transmitting antenna 4215 is placed perpendicular to the plane of the metallic part 4105 and the transmitting antenna 4215 is adapted to generate magnetic field lines parallel to the core of the antenna of the electronic tag 4110 carried by the product 4100.

In a first variant, the presentation means 4210 is adapted to present one product 4110 at a time opposite the transmitting antenna 4215 such that the plane of the metallic part 4105 is perpendicular to the main plane of the transmitting antenna 4215 and such that the core of the antenna of the electronic tag 4110 carried by the product 4100 is substantially parallel to the field lines generated by the transmitting antenna 4215.

In a second variant, the presentation means 4210 is adapted to present, at the same time, a plurality of products 4110 forming a stack opposite the transmitting antenna 4215 such that the plane of each metallic part 4105 is perpendicular to the main plane of the transmitting antenna 4215 and such that the core of the antenna of the electronic tag 4110 carried by each product 4100 is substantially parallel to the field lines generated by the transmitting antenna 4215.

For example, the presentation means 4215 is a manipulator arm, for example a robotized arm or a conveyor.

If the products 4100 comprise blisters, they are placed perpendicular to the transmitting antenna 4215, thereby creating only very little disturbance to the field emitted by the transmitting antenna 4215.

The electronic tag 4110 of each product 4100 is of very small dimensions but can be easily powered by the transmitting antenna 4215 perpendicular to the blisters.

A stack of blisters can therefore be easily identified.

Figure 43:
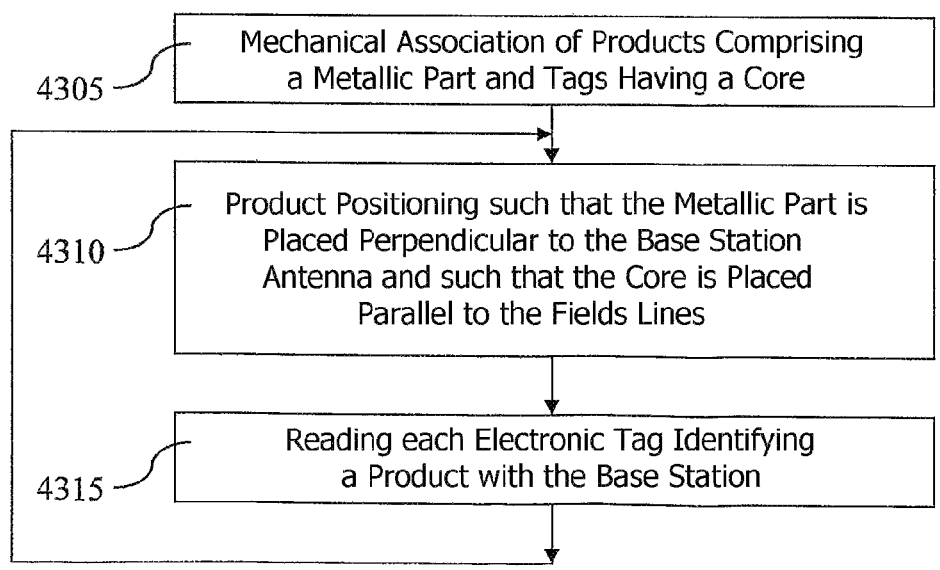

FIG. 43 shows steps of a method for identifying at least one product comprising a substantially flat metallic part.

During a mechanical association step 4305, an electronic tag positioned near and parallel to one edge of said metallic part is associated with the product, said electronic tag comprising a core of electrically-insulating material of relative magnetic permeability above fifty, a coil surrounding said core, coil forming an antenna adapted to receive a query signal from a base station, a memory storing an identification code and processing means adapted to process the query signal from the base station, to determine whether the electronic tag must reply and, if yes, to command transmission of a signal by said antenna.

When the product is of blister type, during step 4305, the electronic tag is automatically deposited in the groove of the blister at the same time as the contents, for example tablets or capsules, stored in the blister.

During a positioning step 4310, the product is positioned opposite a transmitting antenna such that the main plane of the transmitting antenna is placed perpendicular to the plane of said metallic part and such that the core is placed parallel to the magnetic field lines generated by said transmitting antenna.

During a step 4315, the identifications of the electronic tags associated with the products are read, with a base station, simultaneously, according to known deterministic or anti-collision techniques.

As described with reference to FIGS. 39 to 42, this method can be used to identify products despite the presence of a metallic part inside them, despite the small dimension imposed on the electronic tag and, possibly, despite the presentation of the products in stacks.

The various aspects of this invention, their main characteristics and their special characteristics are intended to be combined to form a universal electronic tag reading system. Each main or special characteristic of each aspect of this invention therefore forms a special characteristic of each other aspect of this invention.

The invention claimed is:

1. A passive electronic tag for use in a radio frequency identification system that includes a base station for powering and interrogating the passive electronic tag by transmitting signals at a first frequency, the passive electronic tag comprising:
   an antenna that is detuned with respect to the first frequency at which the base station transmits signals whereby the antenna has a resonance frequency that is at least twice the first frequency;
   a reception circuit for receiving the signals from the base station by means of the antenna;
   a processor circuit for processing the signals received from the base station so as identify a query to which the passive electronic tag should reply; and
   a transmission circuit for generating reply signals at a second frequency that is a sub-multiple of the first frequency by suppressing alternations in the signals received from the base station and transmitting these reply signals to the base station by means of the antenna.

2. The passive electronic tag according to claim 1, wherein the second frequency is less than 100 KHz.

3. The passive electronic tag according to claim 1, wherein the second frequency is equal to half the first frequency.

4. The passive electronic tag according to claim 3, wherein the transmission circuit modulates or loads one alternation out of two of a carrier of the signals received from the base station, so as to obtain a signal of half the first frequency.

5. A radio frequency identification system comprising:
   a base station arranged to power and interrogate transmitting signals at a first frequency; and
   at least one passive electronic tag comprising:
   an antenna that is detuned with respect to the first frequency at which the base station transmits signals whereby the antenna has a resonance frequency that is at least twice the first frequency;
   a reception circuit for receiving the signals transmitted by the base station by means of the antenna;
   a processor circuit for processing the signals received from the base station so as identify a query to which the passive electronic tag should reply; and
   a transmission circuit for generating reply signals at a second frequency that is a sub-multiple of first frequency by suppressing alternations in the signals received from the base station and transmitting these reply signals to the base station by means of the antenna.

* * * * *